(12) United States Patent
Heu et al.

(10) Patent No.: US 10,473,894 B2
(45) Date of Patent: Nov. 12, 2019

(54) SHORT FOCUS LENS OPTICAL SYSTEM AND IMAGING DEVICE INCLUDING THE SAME

(71) Applicant: Samsung Electronics Co., Ltd., Gyeonggi-do (KR)

(72) Inventors: Min Heu, Seoul (KR); Jung-Pa Seo, Gyeonggi-do (KR); Hyun-Jea Kim, Gyeonggi-do (KR); Yong-Jae Lee, Gyeonggi-do (KR); Hwan-Seon Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 91 days.

(21) Appl. No.: 15/340,194

(22) Filed: Nov. 1, 2016

(65) Prior Publication Data

US 2017/0123187 A1 May 4, 2017

(30) Foreign Application Priority Data

Nov. 2, 2015 (KR) .......................... 10-2015-0153438

(51) Int. Cl.
*G02B 13/00* (2006.01)
*G02B 9/62* (2006.01)
*G02B 27/00* (2006.01)

(52) U.S. Cl.
CPC .......... *G02B 13/0045* (2013.01); *G02B 9/62* (2013.01); *G02B 27/0025* (2013.01)

(58) Field of Classification Search
CPC .. G02B 13/0045; G02B 9/62; G02B 27/0025; G02B 13/04; G02B 13/18; G02B 3/04
See application file for complete search history.

(56) References Cited

U.S. PATENT DOCUMENTS

2012/0243108 A1 9/2012 Tsai et al.
2013/0070346 A1* 3/2013 Hsu ......................... G02B 9/62
359/713

(Continued)

FOREIGN PATENT DOCUMENTS

JP 2014-44372 A 3/2014
JP 2014-202766 A 10/2014

(Continued)

OTHER PUBLICATIONS

International Search Report, dated Jan. 6, 2017.
European Search Report dated Aug. 1, 2018.

*Primary Examiner* — Joseph P Martinez
*Assistant Examiner* — Vipin Patel
(74) *Attorney, Agent, or Firm* — Cha & Reiter, LLC.

(57) ABSTRACT

An optical system may include: a first lens having positive refractive power facing an object, the first lens having a first convex face facing the object; a second lens having positive refractive power, the second lens having a second convex face facing the object; a third lens having negative refractive power, the third lens having a third concave face facing an image sensor; a fourth lens adjacent to the third lens; a fifth lens adjacent to the fourth lens, the fifth lens having a fourth face facing the object, the fourth face being convex where the fifth lens intersects the optical axis; and a sixth lens adjacent to the fifth lens. The characteristics of the optical system satisfy equation, $0.4<f/f2<1/6$ (Here, "f" represents a focal distance of the optical system, and "f2" represents the focal distance of the second lens).

18 Claims, 15 Drawing Sheets

(56) References Cited

U.S. PATENT DOCUMENTS

| | | | |
|---|---|---|---|
| 2014/0043695 A1* | 2/2014 | Hsu | G02B 9/62 |
| | | | 359/713 |
| 2014/0063323 A1 | 3/2014 | Yamazaki et al. | |
| 2014/0078603 A1* | 3/2014 | You | G02B 13/0045 |
| | | | 359/738 |
| 2014/0111876 A1 | 4/2014 | Tang et al. | |
| 2014/0211327 A1 | 7/2014 | Chen et al. | |
| 2014/0293458 A1 | 10/2014 | Nabeta | |
| 2015/0260953 A1 | 9/2015 | Ota et al. | |
| 2016/0054543 A1 | 2/2016 | Nabeta | |

FOREIGN PATENT DOCUMENTS

| | | |
|---|---|---|
| JP | 2015-175875 A | 10/2015 |
| WO | 2014/162779 A1 | 10/2014 |

\* cited by examiner

US 10,473,894 B2

SHORT FOCUS LENS OPTICAL SYSTEM AND IMAGING DEVICE INCLUDING THE SAME

CLAIM OF PRIORITY

This application claims the priority under 35 U.S.C. § 119(a) to Korean Application Serial No. 10-2015-0153438, which was filed in the Korean Intellectual Property Office on Nov. 2, 2015, the entire content of which is hereby incorporated by reference.

TECHNICAL FIELD

The present disclosure relates to a lens optical system and an electronic device including the lens optical system. For example, the present disclosure relates to a short focus lens optical system that is provided in, for example, an imaging device for use in electronic devices.

BACKGROUND

Imaging devices (e.g., a camera capable of photographing a still image or a video) have already been widely used. Recently, digital cameras or video cameras, which use a solid image sensor (e.g., a Charge Coupled Device (CCD) or a Complementary Metal-Oxide Semiconductor (CMOS)), have been widely distributed. Such imaging devices that use a solid image sensor (a CCD or a CMOS) replace other optical devices that use film due to the easy image storage and reproduction, as well as smaller size.

In order to acquire a high quality image and/or video image, a plurality of lenses may be used for these imaging devices. A short focus lens optical system, which is constituted with a combination of lenses, may have, for example, a lower F number and a less aberration, thereby allowing higher quality and/or higher resolution images and/or video to be acquired. A large number of lenses generally are necessary in order to obtain a lower F number and less aberration, for example, in order to obtain a bright image with high resolution. Such an optical device has generally been configured in the past as a device specialized to photographing, such as a DSLR camera, but recently has also been used in a miniaturized electronic device, such as a mobile communication terminal or smartphone.

SUMMARY

In order to equip an optical device, such as a short focus lens optical system, in a miniaturized electronic device, it is necessary to reduce the size of the optical system such as the length, width, and/or height of the optical system. By doing so may limit the number of lenses included in the short focus lens optical system. When the number of lenses to be equipped in the short focus lens optical system is limited, it may be difficult to acquire a high quality image and/or video image. For example, with a limited number of lenses, it may be difficult to manufacture a short focus lens optical system having a lower F number and a less aberration.

The present disclosure provides a short focus lens optical system that is miniaturized by being equipped with a small number of lenses (e.g., six (6) lenses), and also provides an imaging device including the short focus lens optical system.

In addition, embodiments disclosed in the present disclosure provides a short focus lens optical system that is excellent in optical characteristics (e.g., an aberration characteristic, a wide angle characteristic, and/or a brightness characteristic) even though the short focus lens optical system is equipped with a small number of lenses (e.g., six (6) lenses), and also provides an electronic device including the short focus lens optical system.

Further, embodiments disclosed in the present disclosure may provide a short focus lens optical system that is excellent in optical characteristics even though the imaging device is equipped with a small number of lenses (e.g., six (6) lenses), thereby allowing the short focus lens optical system to be easily equipped in a miniaturized electronic device and to acquire a high resolution still image and/or video.

According to one embodiment of the present disclosure, an optical system may include: a first lens having a positive refractive power and disposed along an optical axis and to face an object, the first lens further having a first convex face facing the object; a second lens having a positive refractive power and disposed along the optical axis adjacent to the first lens, the second lens further having a second convex face facing the object; a third lens having a negative refractive power and disposed along the optical axis adjacent to the second lens, the third lens further having a third concave face facing an image sensor; a fourth lens disposed along the optical axis adjacent to the third lens, the fourth lens being an aspherical lens; a fifth lens disposed along the optical axis adjacent to the fourth lens, the fifth lens being an aspherical lens and having a fourth face facing the object, the fourth face being convex where the fifth lens intersects the optical axis; and a sixth lens disposed along the optical axis adjacent to the fifth lens, the sixth lens is an aspherical lens. The fourth face of the fifth lens and a fifth face of the sixth lens facing the object has at least one inflection point, and characteristics of the optical system satisfy equation:

$$0.4 < \frac{f}{F2} < 1.6$$

Here, "f" represents a focal distance of the optical system, and "f2" represents a focal distance of the second lens 102.

According to one embodiment of the present disclosure, an imaging device may include: an optical system; an image sensor for detecting an image of an object; and an image signal processor. The optical system may include: a first lens having a positive refractive power and disposed along an optical axis and to face the object, the first lens further having a first convex face facing the object; a second lens having a positive refractive power and disposed along the optical axis adjacent to the first lens, the second lens further having a second convex face facing the object; a third lens having a negative refractive power and disposed along the optical axis adjacent to the second lens, the third lens further having a third concave face facing the image sensor; a fourth lens disposed along the optical axis adjacent to the third lens, the fourth lens being an aspherical lens; a fifth lens disposed along the optical axis adjacent to the fourth lens, the fifth lens being an aspherical lens and having a fourth face facing the object, the fourth face being convex where the fifth lens intersects the optical axis; and a sixth lens disposed along the optical axis adjacent to the fifth lens, the sixth lens being an aspherical lens. The fourth face of the fifth lens and a fifth face of the sixth lens facing the object has at least one inflection point, and characteristics of the optical system satisfy equation:

$$0.4 < \frac{f}{F2} < 1.6$$

Here, "f" represents a focal distance of the optical system, and "f2" represents a focal distance of the second lens 102.

According to embodiments disclosed in the present disclosure, a short focus lens optical system is equipped with a small number of (e.g., six (6)) lenses, but may acquire a bright image with a wide angle and high resolution by adjusting curvature radii of refractive faces of each of the lenses in the optical system and/or by including aspherical lenses in the optical system. In addition, as the short focus lens optical system is equipped with a small number of lenses, the size of the short focus lens optical system (e.g., the length of the optical system in the optical axis direction) is reduced, enabling the short focus lens optical system to be easily mounted even in a miniaturized electronic device such as a smart phone.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
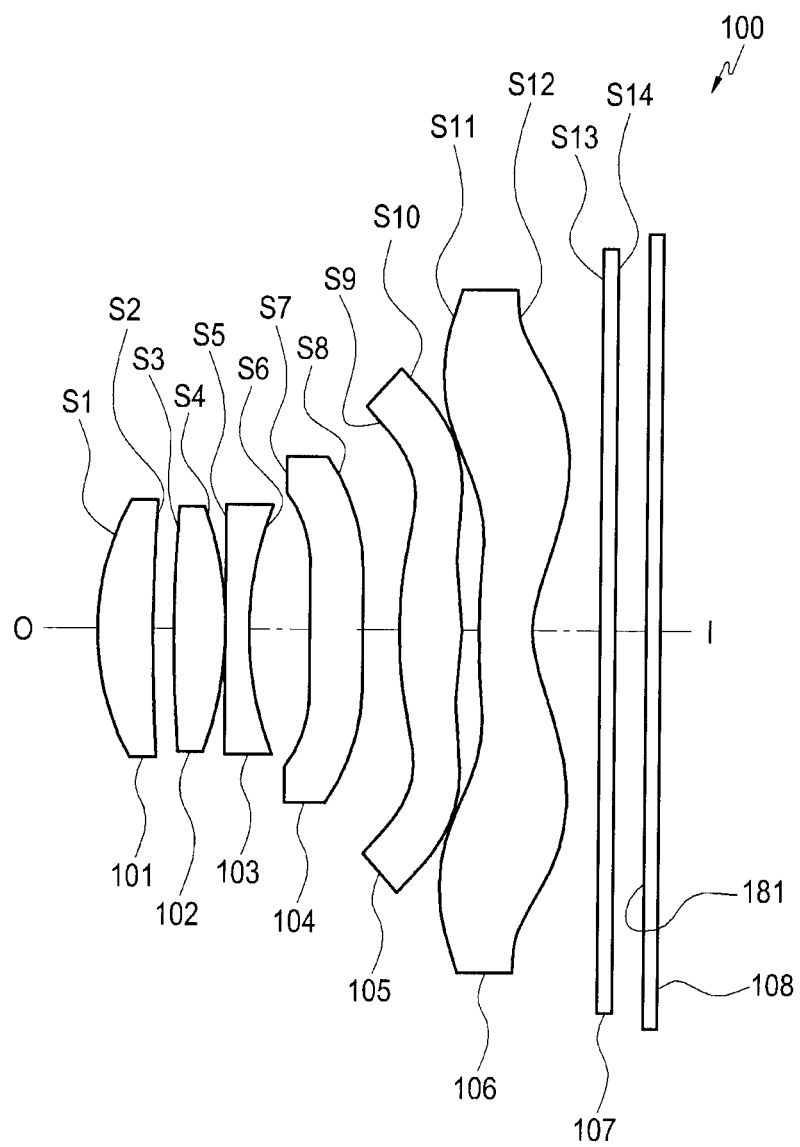
FIG. 1 is a view illustrating a configuration of a short focus lens optical system according to one of various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the present disclosure, the expression "A or B," "at least one of A or/and B," or "one or more of A or/and B" may include all possible combinations of the items listed. The expression "a first," "a second," "the first," or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for," "having the capacity to," "designed to," "adapted to," "made to," or "capable of" in terms of hardware or software, according to circumstances. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

In the present disclosure, the terms are used to describe one or more specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings the same as the contextual meanings in the relevant field of art, and are not to be interpreted to have other meanings unless clearly defined in the present specification. In some cases, even the term defined in the present disclosure should not be interpreted to exclude embodiments of the present disclosure.

An electronic device according to one or more embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to one or more embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In one or more embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to one or more embodiments will be described with reference to the accompanying drawings. In the present disclosure, the term "user" may indicate a person using an electronic device or a device (e.g., an artificial intelligence electronic device) using an electronic device.

Though some numerical values or the like may be presented in describing various embodiments of the present disclosure, it is noted that such numerical values do not limit the present disclosure as long as the numerical values are not defined in the claims.

FIG. 1 is a view illustrating a configuration of a short focus lens optical system 100 according to one of various embodiments of the present disclosure.

Referring to FIG. 1, according to one of various embodiments of the present disclosure, the short focus lens optical system 100 may include a plurality of lenses 101, 102, 103, 104, 105, and 106, and an image sensor 108. According to one of various embodiments of the present disclosure, the image sensor 108 may be configured in an optical device and/or an image device, and the short focus lens optical system including the plurality of lenses may be mounted in the optical device and/or the imaging device in conjunction with the image sensor 108. For example, in describing one or more embodiments of the present disclosure, descriptions will be made with respect to an example in which the image sensor 108 is provided in the short focus lens optical system 100. However, the image sensor 108 may also be mounted in an optical device and/or an imaging device, which are equipped with short focus lens optical system 100, such that the image sensor 108 is separate from the optical system 100. The image sensor 108 may include a sensor, such as a Complimentary Metal Oxide Semiconductor (CMOS) image sensor or a Charge Coupled Device (CCD). Without being limited to these, the image sensor 108 may be a device that converts an image of an object to an electric image signal. The lenses of the short focus lens optical system 100 may include one or more plastic lenses, and the short focus lens optical system 100 may have a field angle of about 80 degrees through the combination of the lenses.

The plurality of lenses may include first, second, third, fourth, fifth, and sixth lenses 101, 102, 103, 104, 105, and 106 that are arranged in this order from an object side O to an image side I. The sixth lens 106 may have a side S12 that is adjacent to, for example, the position where the image sensor 108 is disposed. The fact that the sixth lens 106 is adjacent to the image sensor 108 may signify that the sixth lens 106 and the image sensor 108 are immediately next to each other while coinciding on an optical axis, in this example the optical axis O-I. Each of the first to sixth lenses 101, 102, 103, 104, 105, and 106 may be plastic lenses, and the first to sixth lenses 101, 102, 103, 104, 105, and 106 may be arranged in an optical axis alignment state with, for example, the image sensor 108 so as to form the optical axis O-I of the short focus lens optical system 100. The first lens 101 may have positive refractive power, the second lens 102 may have positive refractive power, and the third lens 104 may have negative refractive power. According to one of various embodiments of the present disclosure, the fourth to sixth lens 104, 105, and 106 may have positive or negative refractive power. In addition, according to one of various embodiments of the present disclosure, the fourth to sixth lens 104, 105, and 106 may not have refractive power. According to one of various embodiments of the present disclosure, a face S1 of the first lens 101, which faces the object side O, may be convex. A face S3 of the second lens 102, which faces the object side O, and a face S4 of the second lens 102, which faces the image side I, may also be convex. A face S6 of the third lens 103, which faces the image side I, may be concave, and a face S9 of the fifth lens 105, which faces the object side O, may be convex where the fifth lens intersects the optical axis O-I. In addition, according to one of various embodiments of the present disclosure, the fourth lens 104, the fifth lens 105, and the six lens 106 may be aspherical lenses.

In describing the configuration of each lens in the following, the image side may refer to the direction towards the imaging face 181 of the image sensor 108, while the object side may refer to the direction towards the object who image is being captured by the image sensor 108. In addition, an "object side face" of a lens may refer to a lens face of a lens on the object side with respect to the optical axis O-I. As an example, the object side is the left side of FIG. 1. Further, an "image side face" may refer to a lens face of a lens on the image side with respect to the optical axis O-I. For example, the image side is the right side of FIG. 1. The imaging face 181 may be, for example, a face of an imaging device or an image sensor.

When parallel beams of light are incident on a lens with positive refractive power, the beams may converge while passing through the lens. For example, a lens with positive refractive power may be a convex lens. On the other hand, when parallel beams of light are incident on a lens with negative refractive power, the beams may diverge while passing through the lens. For example, a lens with negative refractive power may be a concave lens.

The length of the short focus lens optical system 100 in the direction of the optical axis O-I may be reduced as the interval (e.g., an air gap) between each adjacent lenses in the first to sixth lenses 101, 102, 103, 104, 105, and 106 is reduced. According to one embodiment of the present disclosure, the interval between these lenses may be varied during the design of the optical system 100 depending on optical characteristics (e.g., an aberration characteristic, a wide angle characteristic, and/or a brightness characteristic) required for the short focus lens optical system 100.

In addition, in one of various embodiments of the present disclosure, all the curvature radii R3, R4, R5, R6, R7, R8, R9, R10, R11, and R12, the thicknesses, TT, $Y_{IH}$, t58 (defined below), and the focus distances f, f2, and f4 of the lenses may have mm units unless especially mentioned. Further, it is noted that the thickness of the lenses, the intervals between the lenses, TT, $Y_{IH}$, and t58 are distances measured with reference to the optical axis of the optical system O-I. In addition, when it is described that a face has a convex shape in the description for a shape of a lens, it may mean that the optical axis portion of the corresponding face is convex (i.e. the portion of the lens intersecting the optical axis O-I is convex), and when it is described that a face has a concave shape, it may mean that the optical axis portion of the corresponding face is concave. Accordingly, even if it is described that a face of a lens has a convex shape, the edge portion of the lens may be concave. Similarly, even if it is described that a face of a lens has a concave shape, the edge portion of the lens may be convex. In addition, an "inflection point" used in the following detailed description and claims means a point at which the curvature radius is changed at a portion that does not intersect with the optical axis.

According to one of various embodiments of the present disclosure, the short focus lens optical system 100 may include an aperture arranged on the face S1 of the first lens 101, which faces the object side O. When the size of the aperture is adjusted, the quantity of light reaching the imaging face 181 of the image sensor 108 may be adjusted.

According to one of various embodiments of the present disclosure, the short focus lens optical system 100 may further include a filter 107 disposed between the sixth lens 106 and the image sensor 108. The filter 107 may block light detected by a sensor of an optical device (e.g., infrared ray). The filter 107 may include at least one of, for example, a low pass filter and a cover glass. As a result, for example, when the filter 107 is mounted, the color detected and photographed by the image sensor 108 may be made to be similar to the color seen by a human eye when viewing an actual object. In one embodiment, the filter 107 allows visible light to pass while deflecting infrared rays so that the infrared rays are not transmitted to the imaging face 181 of the image sensor 108. However, the short focus lens optical system 100 is not limited so that it must include the filter 106.

According to one of various embodiments of the present disclosure, each of the fifth lens 105 and the six lens 106 may include a face having at least one inflection point. The inflection point may refer to, for example, a point where the curvature radius is changed from positive (+) to negative (−) or negative (−) to positive (+). In other words, the inflection point may refer to, for example, a point where the shape of a lens is changed from convexity to concavity or from concavity to convexity. The curvature radius may refer to a value that indicates a degree of curvature at each point of, for example, a curved face or a surface.

The first lens 101 may increase the overall refractive power of the optical system 100 because it has larger positive refractive power, as compared to the other lenses 102, 103, 104, 105, and 106. In addition, since the face S1 of the first lens 101, which faces the object side, is convex, it is possible to reduce spherical aberration.

The second lens 102 may have larger positive refractive power, as compared to the other lenses 103, 104, 105, and 106. In addition, since the face S3 of the second lens 102, which faces the object side, and the face S4 of the second lens 102, which faces the image side, are convex, it is possible to efficiently correct the spherical aberration of the optical system 100. Accordingly, the face S3 of the second lens 102, which faces the object side, and the face S4 of the second lens 102, which faces the image side, may reduce deterioration in performance of the optical system 100 caused by manufacturing errors.

The third lens 103 has negative refractive power and the face S5 of the third lens 103, which faces the object side, is concave. Thus, the third lens 103 may effectively correct coma aberration and image curvature which may be caused by the second lens 102. In addition, when a material having a high dispersion value is used for the third lens 103, the third lens 103 may effectively correct chromatic aberration generated in the first lens 101 and the second lens 102.

Because the fourth lens 104 is an aspherical lens, it is possible to prevent coma aberration from being generated in a peripheral portion of the image sensor 108 (e.g., the portion furthest from the optical axis O-I). In addition, the fourth lens 104 may have either positive refractive power or negative refractive power. Because the distribution of the refractive power of the short focus lens optical system 100 is determined by the first to third lenses 101, 102, and 103, the fourth lens 104 also may have no refractive power.

In addition, because the face S9 of the fifth lens 5105, which faces the object side, is convex where the fifth lens intersects the optical axis O-I, light incident on the imaging face 181 of the image sensor may be made so that quantity of light received on the peripheral portion of the image face 181 is increased. Accordingly, the short focus lens optical system 100 may enable the imaging face 181 of the image sensor to acquire an excellent image even under a low illuminance.

Because the face S11 of the sixth lens 106, which faces the object side, or the face S12 of the sixth lens 106, which faces the image side, includes at least one inflection point, the sixth lens 106 may reduce the image face curvature from the center of the imaging face 181 of the image sensor to the peripheral portion thereof.

Upon satisfying the following Equation 1 while having a field angle of about 80 degrees, the above-described short focus lens optical system 100 may have an excellent optical characteristic while being miniaturized.

$$0.4 < \frac{f}{F2} < 1.6 \qquad \text{Equation 1}$$

Here, "f" may represent the focal distance of the entire optical system, and "f2" may represent the focal distance of the second lens 102. For example, when a ratio of the focal distance of the second lens 102 in relation to the focal distance of the entire optical system is set to be less than 1.6, it is possible to prevent the increase of spherical aberration by the refractive power of the second lens 102. When the ratio of the focal distance of the second lens 102 in relation to the focal distance of the entire optical system is set to exceed 0.4, it is possible to prevent the refractive power of the first lens 101 from increasing such that the short focus lens optical system 100 may have a field angle of about 80 degrees.

In addition, the third lens 103 may satisfy Equation 2 as follows.

$$-0.6 < \frac{R6}{R5} < 0.6 \qquad \text{Equation 2}$$

Here, "R5" may represent the curvature radius of the face S5 of the third lens 103, which faces the object side, and "R6" may represent the curvature radius of the face S6 of the third lens 103, which faces the image side. When the ratio of the curvature radius of the face S6 of the third lens 103, which faces the image side, in relation to the curvature radius of the face S5 of the third lens 103, which faces the object side, is adjusted, the coma aberration of the peripheral portion of the imaging face 181 of the image sensor, which is generated due to large diameter lenses, may be properly corrected. For example, when the ratio of the curvature radius of the face S6 of the third lens 103, which faces the image side, in relation to the curvature radius of the face S5 of the third lens 103, which faces the object side, is set to exceed −0.6, it is possible to prevent the inclination of light directed to the imaging face 181 of the image sensor from increasing in relation to the optical axis, which is generated due to large diameter lenses. When the ratio of the curvature radius of the face S6 of the third lens 103, which faces the image side, in relation to the curvature radius of the face S5 of the third lens 103, which faces the object side, is set to be less than 0.6, it is possible to properly correct the coma aberration by preventing the negative refractive power of the third lens 103. In a range out of the upper limit (i.e. when the ratio exceeds 0.6), it may become difficult to effectively correct the coma aberration or the machinability of the third lens may be deteriorated.

In addition, the third lens 103 may satisfy Equation 3 as follows.

$$vd < 45 \qquad \text{Equation 3}$$

Here, "vd" may represent the Abbe number of the third lens. When the Abbe number of the third lens 103 is set to be less than 45, it is possible to prevent aberration (in particular, a longitudinal chromatic aberration) from increasing so as to increase image quality.

In addition, the second lens 102 may satisfy Equation 4 as follows.

$$-2 < \frac{R3}{R4} < 0 \qquad \text{Equation 4}$$

Here, "R3" may represent the curvature radius of the face S3 of the second lens 102, which faces the object side, and "R4" may represent the curvature radius of the face S4 of the second lens 102, which faces the image side. When the ratio of the curvature radius of the face S3 of the second lens 102, which faces the object side, in relation to the curvature radius of the face S4 of the second lens 102, which faces the image side, is adjusted, the coma aberration of the peripheral portion of the imaging face 181 of the image sensor, which is generated due to large diameter lenses, may be properly corrected. Accordingly, the spherical aberration of the image may be effectively limited. That is, as the ratio of the curvature radius of the face S3 of the second lens 102, which faces the object side, in relation to the curvature radius of the face S4 of the second lens 102, which faces the image side, increases, the inclination thereof becomes lower so that the spherical aberration value is reduced. When the ratio of Equation 4 exceeds 0, the spherical aberration may be subject to excessive overcorrection, and thus the aberration may increase again. In addition, in a case where, in Equation 4, "R3" is set to be large and "R4" is set to be small so that the ratio approaches the value of −2, the peripheral coma aberration of rays in the upper portion of the image may be under-corrected and the peripheral coma aberration rays of rays in the lower-portion of the image may be over-corrected so that the entire peripheral coma aberration may be reduced. However, when the ratio of Equation 4 lower than the lower limit of −2, the peripheral coma aberration may increase.

In addition, the fourth lens 104 may satisfy Equation 5 as follows.

$$-0.15 < \frac{f}{f4} < 0.15 \qquad \text{Equation 5}$$

Here, "f4" may represent the focal distance of the fourth lens 104. By adjusting the refractive power of the fourth lens 104, the Petzval sum and the astigmatism of the imaging face 181 of the image sensor may be effectively corrected. For example, when the ratio of the focal distance of the entire optical system in relation to the focal distance of the fourth lens 104 exceeds the upper limit of 0.15, reduction of the Petzval sum may be limited. And when the ratio is smaller than the lower limit of −0.15, the difference in peripheral astigmatism becomes 10% or more so that it may be impossible to suppress the occurrence of the image face curvature on the imaging face 181 of the image sensor.

In addition, the short focus lens optical system 100 may satisfy Equation 6 as follows.

$$0 < \frac{t58}{Y_{IH}} < 1 \qquad \text{Equation 6}$$

Here, "t58" may represent a distance (e.g., an air gap) on the optical axis from the face S5 of the third lens 103, which faces the object side, to the face S8 of the fourth lens 104, which faces the image side, and "$Y_{IH}$" may represent a maximum height of an image captured by the image sensor. For example, "$Y_{IH}$" may be the radius of the image sensor 108. As the ratio of the y axis length of the image sensor 108 ($Y_{IH}$) in relation to the air gap t58 becomes less than 1, it is possible to reduce the length of the short focus lens optical system 100 in the direction of the optical axis O-I, and as the ratio of the y axis length of the image sensor 108 ($Y_{IH}$) in relation to the air gap t58 is set to be larger than 0, it is possible to effectively correct the Petzval sum and to prevent an image captured on the imaging face of the image sensor from being distorted.

In addition, the fifth lens 105 may satisfy Equation 7 as follows.

$$0 < \frac{R9 - R10}{R9 + R10} < 3 \qquad \text{Equation 7}$$

Here, "R9" may represent the curvature radius of the face S9 of the fifth lens 105, which faces the object side, and "R10" may represent the curvature radius of the face S10 of the fifth lens 105, which faces the image side. As the curvature radius R9 of the face S9 of the fifth lens 105, which faces the object side, and the curvature radius R10 of the face S10 of the fifth lens 105, which faces the image side, are formed within the range of Equation 7, the fifth lens 105 may reduce the amount of image face curvature generated on the imaging face 181 of the image sensor.

In addition, the sixth lens 106 may satisfy Equation 8 as follows.

$$0 < \frac{R11 - R12}{R11 + R12} < 0.8 \qquad \text{Equation 8}$$

Here, "R11" may represent the curvature radius of the face S11 of the sixth lens 106, which faces the object side, and "R12" may represent the curvature radius of the face S12 of the sixth lens 106, which faces the image side. As the curvature radius R11 of the face S11 of the sixth lens 106, which faces the object side, and the curvature radius R12 of the face S12 of the sixth lens 106, which faces the image side, are formed within the range of Equation 8, the sixth lens 106 may reduce the amount of image face curvature generated on the imaging face 181 of the image sensor. In addition, when the ratio of Equation 8 has a value exceeding 0.8, a problem may occur in that the inclination angle of peripheral light rays with respect to the main ray incident on the image face may rapidly increase.

In addition, the short focus lens optical system 100 may satisfy Equation 9 as follows.

$$1.0 < \frac{TT}{Y_{IH}} < 1.8 \qquad \text{Equation 9}$$

Here, "TT" may represent a distance on the optical axis from a face of the first lens, which faces the object side, to the imaging face of the image sensor. For example, as the ratio of the distance on the optical axis from the face S1 of the first lens 101, which faces the object side, to the imaging face 181 of the image sensor, TT, in relation to the radius of the image sensor 108, $Y_{IH}$, becomes smaller than 1.8, it is possible to reduce the length of the short focus lens optical system 100 in the direction of the optical axis. As the ratio of the distance on the optical axis from the face S1 of the first lens 101, which faces the object side, to the imaging face 181 of the image sensor, TT, in relation to the radius of the image sensor 108, $Y_{IH}$, becomes larger than 1, it is possible to prevent the inclination of light incident on a peripheral portion of the image sensor 108 from increasing with respect to the optical axis while reducing the amount of distortion aberration generated when the field angle of about 80 degrees.

Data for various characteristics of the lenses in the short focus lens optical system 100 are represented in Table 1 below, in which "S1 to S14" may indicate the faces of related lenses 101, 102, 103, 104, 105, and 106 and/or the surface of the filter 107. In addition, "sto*" may represent an aperture provided on the face S1 of the first lens 101, which faces the object side. In addition, "Radius" may represent the curvature radius, "Thick" may represent the thickness or an air gap, "nd" may represent the refractive index, "vd" may represent the Abbe number, "H-Ape" may represent the radius of the faces, and "EFL" may represent the focal distance. The short focus lens optical system 100 may satisfy the above-mentioned requirements (and/or at least one of the above-mentioned requirements) when the F-number is 1.76, the field angle is 82.20 degrees, and the focal distance is 4.10 mm.

TABLE 1

| Surface | Radius | Thick | nd | vd | H-Ape | EFL |
|---|---|---|---|---|---|---|
| object | infinity | infinity | | | | |
| sto* | infinity | | | | | |
| S1 | 2.052 | 0.474 | 1.5441 | 56.09 | 1.17 | 5.1 |
| S2 | 7.141 | 0.201 | | | 1.14 | |
| S3 | 5.926 | 0.467 | 1.5441 | 56.09 | 1.095 | 5.532 |
| S4 | −6.001 | 0.03 | | | 1.14 | |
| S5 | −10.06 | 0.21 | 1.65038 | 21.52 | 1.15 | −5.073 |
| S6 | 5.03 | 0.554 | | | 1.13 | |
| S7 | infinity | 0.499 | 1.65038 | 21.52 | 1.28 | infinity |
| S8 | infinity | 0.36 | | | 1.6 | |
| S9 | 13.062 | 0.56 | 1.5441 | 56.09 | 2.05 | 4.054 |

TABLE 1-continued

| Surface | Radius | Thick | nd | vd | H-Ape | EFL |
|---|---|---|---|---|---|---|
| S10 | −2.627 | 0.173 | | | 2.41 | |
| S11 | 3.122 | 0.51 | 1.5348 | 55.71 | 3.07 | −3.087 |
| S12 | 1.021 | 0.635 | | | 3.14 | |
| S13 | infinity | 0.11 | 1.5168 | 64.2 | 3.5 | |
| S14 image | infinity | 0.3 | | | | |

Aspherical coefficients of the first to sixth lenses 101, 102, 103, 104, 105, and 106 are represented in Table 2 below in which the aspherical coefficients may be calculated through Equation 10 as follows.

$$z = \frac{cY^2}{1+\sqrt{1-(1+K)c^2Y^2}} + AY^4 + BY^4 + CY^4 + DY^4 + EY^4 + FY^4 + \ldots$$

Equation 10

Here, "z" may represent a distance from the apex of a lens in the optical axis direction, "c" may represent a basic curvature of a lens, "Y" may represent a distance in a direction perpendicular to an optical axis, "K" may represent a Conic constant, and "A," "B," "C," "D," "E," and "F" may represent aspherical coefficients, respectively.

TABLE 2

| Surface | K(Conic) | A(4th) | B(6th) | C(8th) | D(10th) |
|---|---|---|---|---|---|
| S1 | −9.73816E−01 | −1.93529E−02 | 7.51762E−02 | −2.72689E−01 | 4.78028E−01 |
| S2 | 6.73116E+00 | −3.84823E−02 | −1.12441E−01 | 4.43542E−01 | −9.56773E−01 |
| S3 | −1.16346E+00 | −7.23061E−02 | 1.32692E−01 | −4.59968E−01 | 1.08373E+00 |
| S4 | 2.17844E+01 | 2.89139E−02 | −2.88119E−01 | 9.34721E−01 | −1.80966E+00 |
| S5 | −3.47815E+02 | 4.47445E−02 | −1.88336E−01 | 4.93123E−01 | −9.20259E−01 |
| S6 | 7.86223E+00 | 5.25375E−02 | −2.44782E−02 | −1.24163E−01 | 4.11875E−01 |
| S7 | Infinity | −2.52049E−02 | −2.23813E−01 | 7.43769E−01 | −1.37741E+00 |
| S8 | Infinity | −3.97183E−02 | −1.05563E−01 | 1.59544E−01 | −1.32759E−01 |
| S9 | 3.78639E+01 | 1.86581E−01 | −2.44700E−01 | 1.88743E−01 | −1.12694E−01 |
| 10 | −2.07312E+01 | 2.00696E−01 | −1.28269E−01 | 4.10472E−02 | −9.92413E−03 |
| 11 | −3.53500E+00 | −1.84094E−01 | 7.28308E−02 | −1.98214E−02 | 4.25157E−03 |
| 12 | −4.83836E+00 | −9.86988E−02 | 4.67305E−02 | −1.69628E−02 | 4.02317E−03 |

| Surface | E(12th) | F(14th) | G(16th) | H(18th) |
|---|---|---|---|---|
| S1 | −5.02832E−01 | 3.05244E−01 | −9.68161E−02 | 1.22670E−02 |
| S2 | 1.24235E+00 | −9.49559E−01 | 3.96630E−01 | −6.98356E−02 |
| S3 | −1.44834E+00 | 1.10778E+00 | −4.53668E−01 | 7.59619E−02 |
| S4 | 2.11071E+00 | −1.45423E+00 | 5.48382E−01 | −8.79723E−02 |
| S5 | 1.04594E+00 | −6.63228E−01 | 2.20679E−01 | −3.05287E−02 |
| S6 | −6.36984E−01 | 5.66516E−01 | −2.64918E−01 | 5.11075E−02 |
| S7 | 1.53088E+00 | −1.02437E+00 | 3.79445E−01 | −6.00284E−02 |
| S8 | 7.09799E−02 | −2.46177E−02 | 5.21093E−03 | −5.13319E−04 |
| S9 | 4.52648E−02 | −1.12401E−02 | 1.55287E−03 | −9.06960E−05 |
| S10 | 2.14506E−03 | −3.77376E−04 | 4.11837E−05 | −1.91754E−06 |
| S11 | −6.37406E−04 | 5.95737E−05 | −3.07911E−06 | 6.69661E−08 |
| S12 | −6.06926E−04 | 5.60030E−05 | −2.84670E−06 | 6.04679E−08 |

Figure 2:
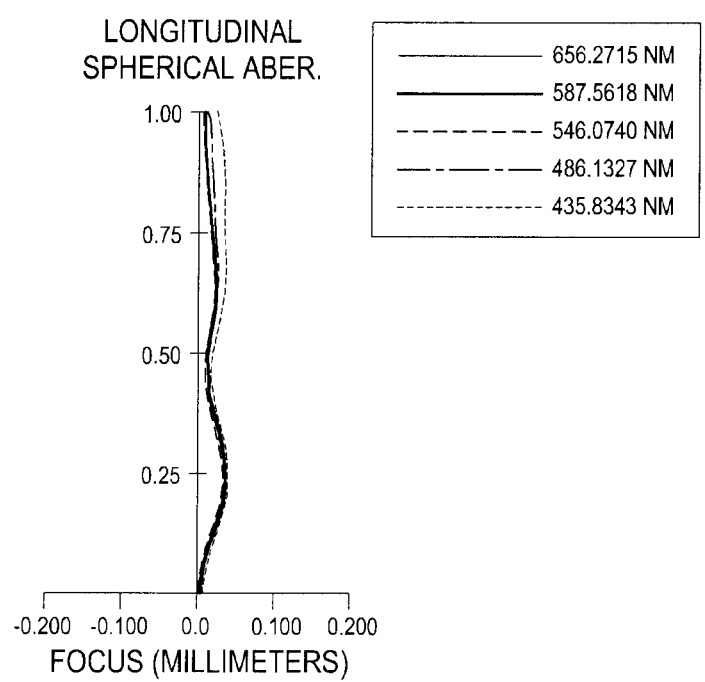
FIG. 2 is a graph illustrating a spherical aberration of the short focus lens optical system according to one of various embodiments of the present disclosure.

FIG. 2 is a graph illustrating a spherical aberration of the short focus lens optical system 100 according to one of various embodiments of the present disclosure.

In FIG. 2, the horizontal axis represents a degree of a longitudinal spherical aberration, and the vertical axis represents a normalized distance from the center of an optical axis. A change in a longitudinal spherical aberration according to a wavelength of light is illustrated in FIG. 2. Longitudinal spherical aberrations may be represented for lights having wavelengths of, for example, 656.2725 nm, 587.5618 nm, 546.0740 nm, 486.1327 nm, or 435.8343 nm, respectively.

Figure 3:
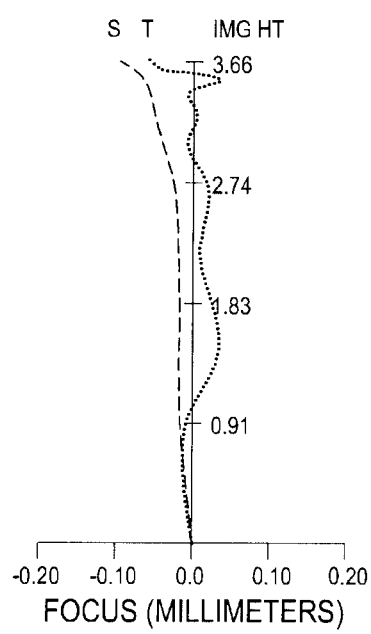
FIG. 3 is a graph illustrating an astigmatism of the short focus lens optical system according to one of various embodiments of the present disclosure.

FIG. 3 is a graph illustrating an astigmatism of the short focus lens optical system 100 according to one of various embodiments of the present disclosure.

In FIG. 3, the astigmatism of the short focus lens optical system 100 is obtained at a wavelength of 546.074 nm. In FIG. 3, the solid line represents an astigmatism in a tangential direction (e.g., a tangential field curvature), and the dot line represents an astigmatism in a sagittal direction (e.g., a sagittal field curvature).

Figure 4:
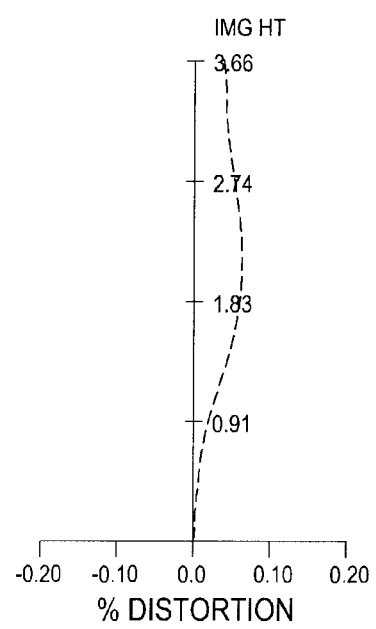
FIG. 4 is a graph illustrating a distortion rate of the short focus lens optical system according to one of various embodiments of the present disclosure.

FIG. 4 is a graph illustrating a distortion rate of the short focus lens optical system 100 according to one of various embodiments of the present disclosure.

Referring to FIG. 4, an image captured through the short focus lens optical system 100 may have some distortion generated at a point that deviates from the optical axis O-I, but such distortion ordinarily occurs in an optical device that uses lenses. The short focus lens optical system 100 may provide a good optical characteristic with a distortion rate of less than 3%.

Figure 5:
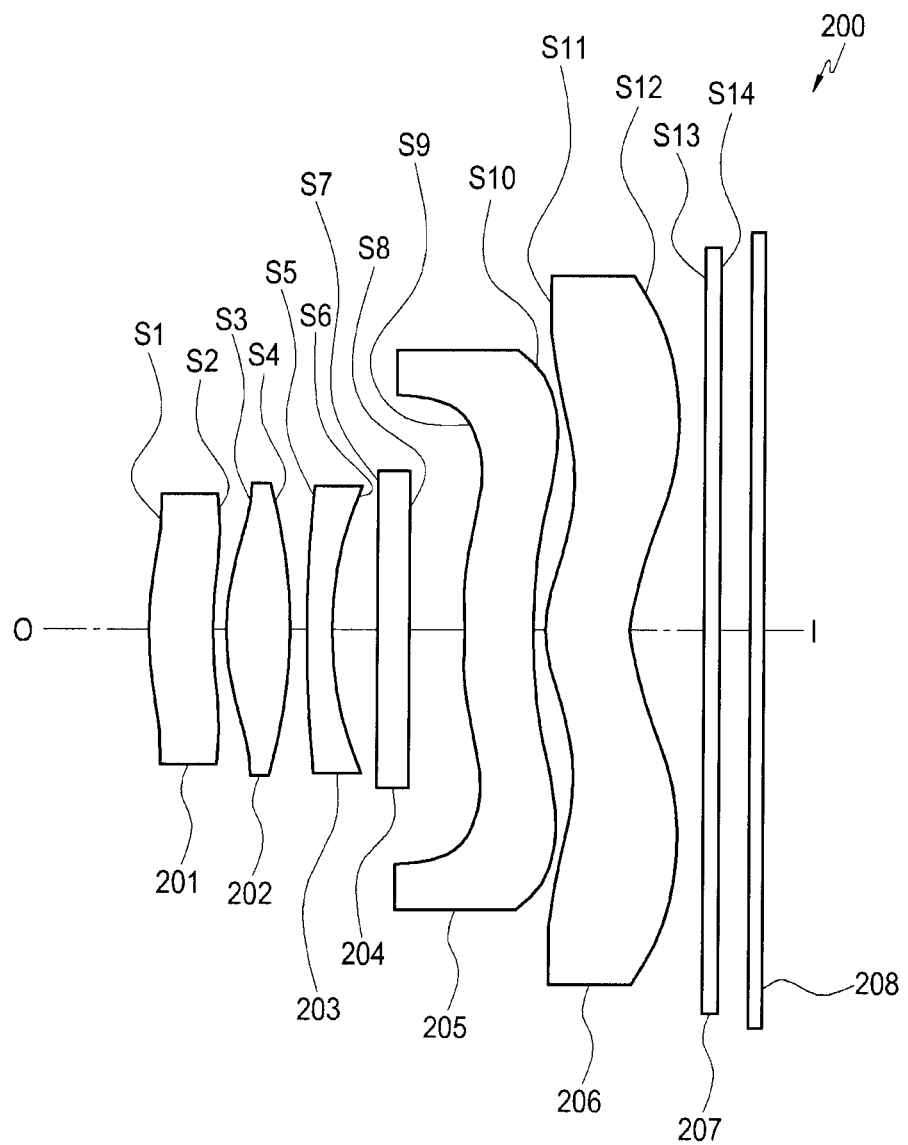
FIG. 5 is a view illustrating a configuration of a short focus lens optical system according to another one of various embodiments of the present disclosure.
Figure 6:
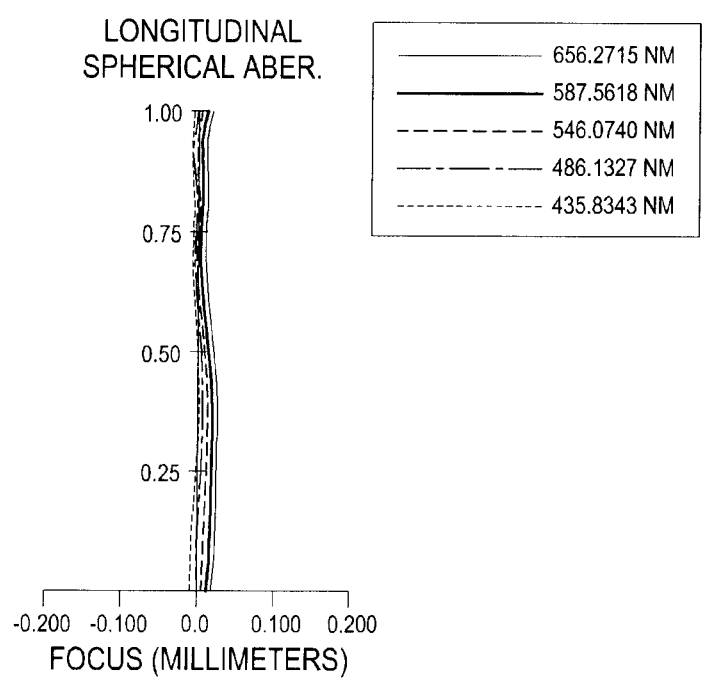
FIG. 6 is a graph illustrating a spherical aberration of the short focus lens optical system according to another one of various embodiments of the present disclosure.
Figure 7:
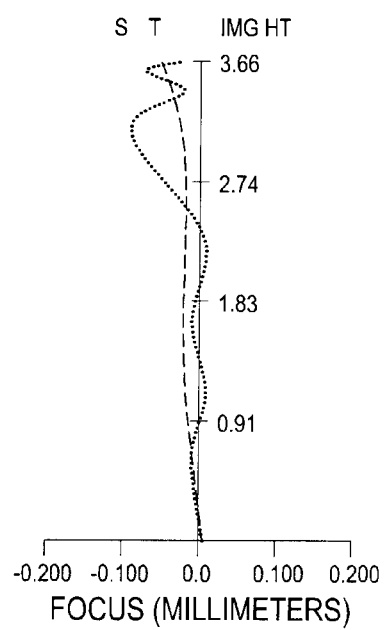
FIG. 7 is a graph illustrating an astigmatism of the short focus lens optical system according to another one of various embodiments of the present disclosure.
Figure 8:
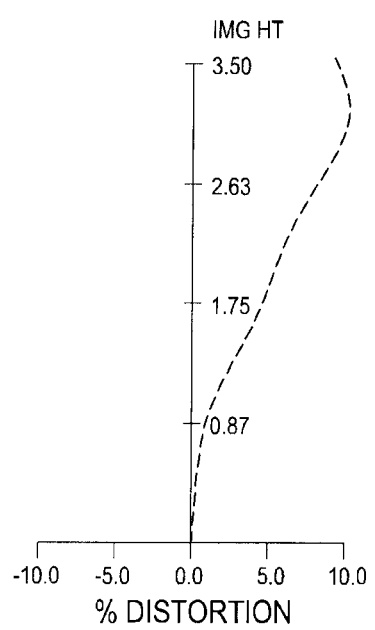
FIG. 8 is a graph illustrating a distortion rate of the short focus lens optical system according to another one of various embodiments of the present disclosure.

FIG. 5 is a view illustrating a configuration of a short focus lens optical system 200 according to another one of various embodiments of the present disclosure. FIG. 6 is a graph illustrating a spherical aberration of the short focus lens optical system 200 according to another one of various embodiments of the present disclosure. FIG. 7 is a graph illustrating an astigmatism of the short focus lens optical system 200 according to another one of various embodiments of the present disclosure. FIG. 8 is a graph illustrating a distortion rate of the short focus lens optical system 200 according to another one of various embodiments of the present disclosure.

In describing one or more embodiments of the present disclosure below, the components described therein that can be easily understood through the configuration of the preceding embodiment may be denoted by the same reference numerals or the reference numerals may be omitted, and the detailed descriptions thereof may also be omitted.

Referring to FIGS. 5 to 8, according to another one of various embodiments of the present disclosure, the short focus lens optical system 200 may include a plurality of lenses 201, 202, 203, 204, 205, and 206, a filter 207, and an image sensor 208.

Data for various characteristics of the lenses in the short focus lens optical system 200 are represented in Table 3 below, and aspherical coefficients of the first to sixth lenses 201, 202, 203, 204, 205, and 206 are represented in Table 4 below. The short focus lens optical system 200 may satisfy the above-mentioned requirements (and/or at least one of the above-mentioned requirements) when the F-number is 1.72, the field angle is 79.05 degrees, and the focal distance is 3.97 mm.

TABLE 3

| Surface | Radius | Thick | nd | vd | H-Ape | EFL |
|---|---|---|---|---|---|---|
| object | infinity | infinity | | | | |
| sto* | infinity | | | | | |
| S1 | 3.295 | 0.564 | 1.5441 | 56.09 | 1.15 | 70 |
| S2 | 3.388 | 0.128 | | | 1.18 | |
| S3 | 2.266 | 0.552 | 1.5441 | 56.09 | 1.258 | 3.339 |
| S4 | −8.558 | 0.15 | | | 1.282 | |
| S5 | 7.455 | 0.215 | 1.651 | 21.49 | 1.25 | −7.478 |
| S6 | 2.93 | 0.412 | | | 1.217 | |
| S7 | 38.424 | 0.275 | 1.6428 | 22.4 | 1.305 | 212.251 |
| S8 | 53.122 | 0.487 | | | 1.4 | |
| S9 | 12.534 | 0.619 | 1.5311 | 55.91 | 2.081 | −20.457 |
| S10 | 5.733 | 0.108 | | | 2.448 | |
| S11 | 1.292 | 0.751 | 1.5441 | 56.09 | 2.677 | 12.636 |
| S12 | 1.263 | 0.66 | | | 3.111 | |
| S13 | infinity | 0.118 | 1.5168 | 64.2 | 3.36 | |
| S14 | infinity | 0.3 | | | | |
| image | | | | | | |

TABLE 4

| Surface | K(Conic) | A(4th) | B(6th) | C(8th) | D(10th) |
|---|---|---|---|---|---|
| S1 | −2.54909E+00 | −3.64754E−02 | 9.34106E−03 | −6.88845E−02 | 1.56509E−01 |
| S2 | −5.15302E+00 | −1.17111E−01 | 3.05398E−02 | −5.92181E−02 | 9.71251E−02 |
| S3 | −6.99451E+00 | −1.41083E−02 | −3.78287E−02 | 4.17834E−02 | −8.03999E−02 |
| S4 | 2.01421E+01 | −3.48471E−02 | −1.21795E−02 | 5.25808E−02 | −7.95776E−02 |
| S5 | 2.54388E+01 | −8.48045E−02 | 8.28702E−02 | −3.46047E−02 | −3.08860E−02 |
| S6 | −4.95218E+00 | −1.43813E−02 | 4.89751E−02 | 2.11204E−02 | −1.11812E−01 |
| S7 | 6.38647E+02 | −2.42317E−02 | −9.10215E−02 | 2.91536E−01 | −4.68133E−01 |
| S8 | −4.12791E+03 | −6.39198E−03 | −8.36337E−02 | 7.96663E−02 | 1.90799E−02 |
| S9 | 1.36968E+01 | 1.95251E−01 | −2.62114E−01 | 2.30814E−01 | −1.51957E−01 |
| S10 | −2.63741E+01 | 2.45773E−02 | 2.84037E−02 | −3.86676E−02 | 1.81504E−02 |
| S11 | −3.47930E+00 | −1.09350E−01 | 3.53359E−02 | −1.17702E−02 | 3.03469E−03 |
| S12 | −2.67982E+00 | −7.67287E−02 | 2.24247E−02 | −4.78374E−03 | 3.95304E−04 |

| Surface | E(12th) | F(14th) | G(16th) | H(18th) |
|---|---|---|---|---|
| S1 | −2.22456E−01 | 1.83457E−01 | −7.88125E−02 | 1.36207E−02 |
| S2 | −4.80225E−02 | −9.63338E−03 | 1.53218E−02 | −3.62795E−03 |
| S3 | 1.83353E−01 | −1.84693E−01 | 8.38599E−02 | −1.46939E−02 |
| S4 | 9.79320E−02 | −7.82680E−02 | 3.24320E−02 | −5.47088E−03 |
| S5 | 5.93570E−02 | −4.85199E−02 | 2.11617E−02 | −3.67089E−03 |
| S6 | 1.11859E−01 | −5.05385E−02 | 9.62387E−03 | −1.27777E−04 |
| S7 | 4.84241E−01 | −3.04470E−01 | 1.04970E−01 | −1.52916E−02 |
| S8 | −8.03092E−02 | 6.35900E−02 | −2.21580E−02 | 2.87453E−03 |
| S9 | 6.74320E−02 | −1.88462E−02 | 2.96596E−03 | −1.98314E−04 |
| S10 | −4.73362E−03 | 7.18618E−04 | −5.87396E−05 | 1.97022E−06 |
| S11 | −3.96913E−04 | 1.56345E−05 | 1.16903E−06 | −8.97717E−08 |
| S12 | 5.51241E−05 | −1.47890E−05 | 1.17369E−06 | −3.28992E−08 |

Figure 9:
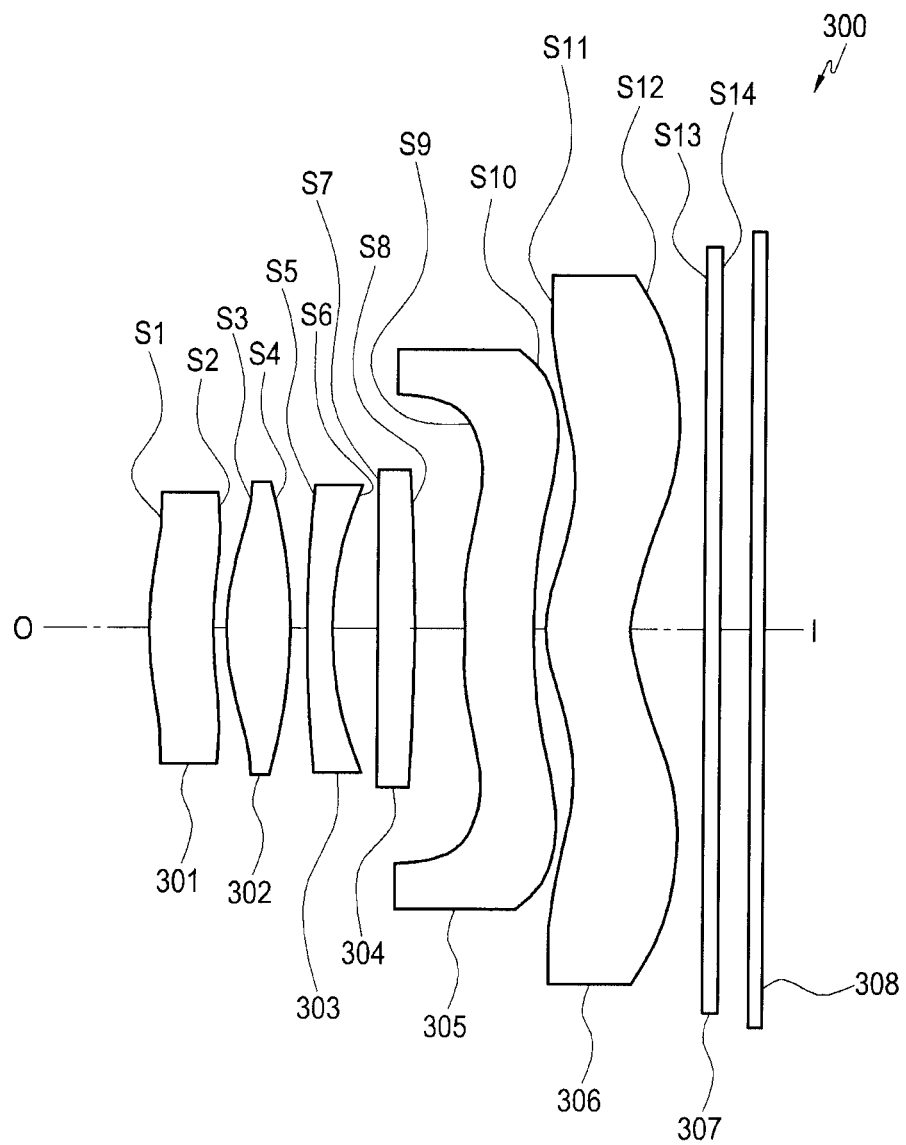
FIG. 9 is a view illustrating a configuration of a short focus lens optical system according to still another one of various embodiments of the present disclosure.
Figure 10:
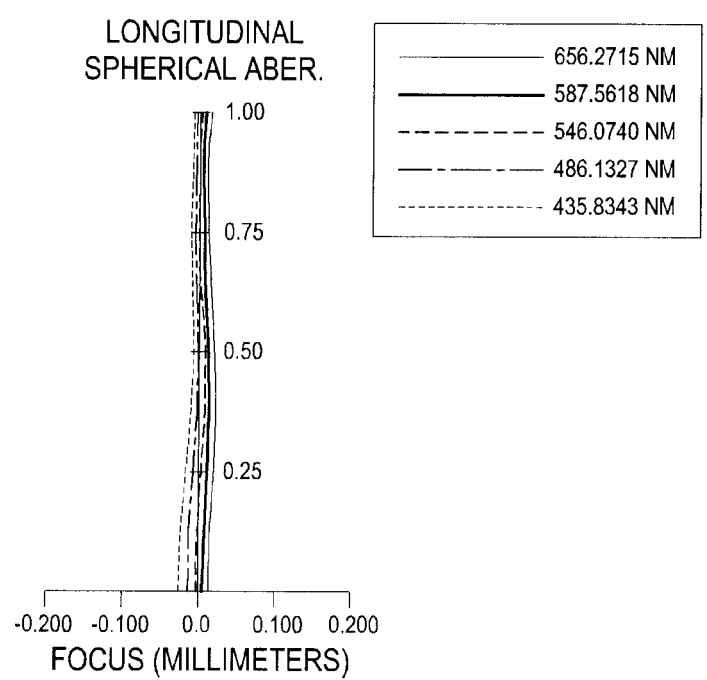
FIG. 10 is a graph illustrating a spherical aberration of the short focus lens optical system according to still another one of various embodiments of the present disclosure.
Figure 11:
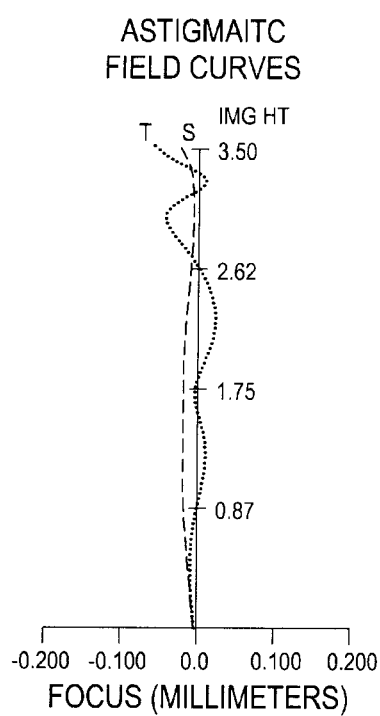
FIG. 11 is a graph illustrating an astigmatism of the short focus lens optical system according to still another one of various embodiments of the present disclosure.
Figure 12:
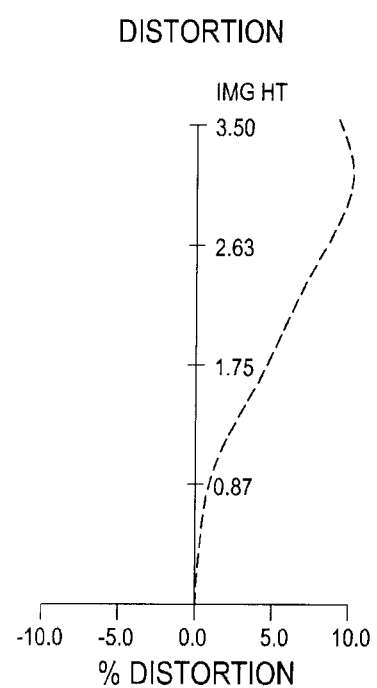
FIG. 12 is a graph illustrating a distortion rate of the short focus lens optical system according to still another one of various embodiments of the present disclosure.

FIG. 9 is a view illustrating a configuration of a short focus lens optical system 300 according to still another one of various embodiments of the present disclosure. FIG. 10 is a graph illustrating a spherical aberration of the short focus lens optical system 300 according to still another one of various embodiments of the present disclosure. FIG. 11 is a graph illustrating an astigmatism of the short focus lens optical system 300 according to still another one of various embodiments of the present disclosure. FIG. 12 is a graph illustrating a distortion rate of the short focus lens optical system 300 according to still another one of various embodiments of the present disclosure.

In describing one or more embodiments of the present disclosure below, the components described therein that can be easily understood through the configuration of the preceding embodiment may be denoted by the same reference numerals or the reference numerals may be omitted, and the detailed descriptions thereof may also be omitted.

Referring to FIGS. 9 to 12, according to still another one of various embodiments of the present disclosure, the short focus lens optical system 300 may include a plurality of lenses 301, 302, 303, 304, 305, and 306, a filter 307, and an image sensor 308.

Data for various characteristics of the lenses in the short focus lens optical system 300 are represented in Table 5 below, and aspherical coefficients of the first to sixth lenses 301, 302, 303, 304, 305, and 306 are represented in Table 6 below. The short focus lens optical system 300 may satisfy the above-mentioned requirements (and/or at least one of the above-mentioned requirements) when the F-number is 1.77, the field angle is 80.17 degrees, and the focal distance is 3.88 mm.

TABLE 5

| Surface | Radius | Thick | nd | vd | H-Ape | EFL |
|---|---|---|---|---|---|---|
| object | infinity | infinity | | | 9582754 | 87076448000 |
| sto* | infinity | | | | | |
| S1 | 2.855 | 0.528 | 1.5441 | 56.09 | 1.1 | 67.057 |
| S2 | 2.894 | 0.115 | | | 1.18 | |
| S3 | 2.134 | 0.593 | 1.5441 | 56.09 | 1.259 | 3.417 |
| S4 | −13.471 | 0.106 | | | 1.282 | |
| S5 | 5.812 | 0.213 | 1.651 | 21.49 | 1.25 | −7.618 |
| S6 | 2.652 | 0.42 | | | 1.217 | |
| S7 | 36.003 | 0.29 | 1.6428 | 22.4 | 1.308 | 32.11 |
| 8* | −49.413 | 0.501 | | | 1.4 | |
| 9* | 14.351 | 0.635 | 1.5311 | 55.91 | 2.081 | −17.548 |
| 10* | 5.578 | 0.1 | | | 2.464 | |
| 11* | 1.362 | 0.786 | 1.5441 | 56.09 | 2.68 | 15.612 |
| 12* | 1.29 | 0.549 | | | 3.159 | |
| 13 | infinity | 0.11 | 1.5168 | 64.2 | | |
| 14 | infinity | 0.3 | | | | |
| image | infinity | | | — | | |

TABLE 6

| Surface | K(Conic) | A(4th) | B(6th) | C(8th) | D(10th) |
|---|---|---|---|---|---|
| S1 | −1.52827E+00 | −3.39072E−02 | 7.65144E−03 | −6.68927E−02 | 1.56400E−01 |
| S2 | −5.34345E+00 | −1.16698E−01 | 3.17671E−02 | −5.82360E−02 | 9.74431E−02 |
| S3 | −6.96054E+00 | −1.24469E−02 | −3.64544E−02 | 4.27798E−02 | −7.93564E−02 |
| S4 | 4.14410E+01 | −4.16220E−02 | −1.00160E−02 | 5.23264E−02 | −7.99563E−02 |
| S5 | 1.63630E+01 | −9.62764E−02 | 7.98170E−02 | −3.46675E−02 | −3.14969E−02 |
| S6 | −4.56816E+00 | −1.45431E−02 | 4.92478E−02 | 2.10991E−02 | −1.11837E−01 |
| S7 | 2.22716E+02 | −2.46004E−02 | −9.08804E−02 | 2.91566E−01 | −4.67962E−01 |
| S8 | 0.00000E+00 | −8.07645E−03 | −8.46070E−02 | 7.96980E−02 | 1.90991E−02 |
| S9 | 3.74615E+01 | 1.85982E−01 | −2.58299E−01 | 2.29566E−01 | −1.51843E−01 |
| S10 | −2.16525E+01 | 1.96343E−02 | 2.99602E−02 | −3.88052E−02 | 1.81282E−02 |
| S11 | −4.18615E+00 | −1.05483E−01 | 3.51025E−02 | −1.18080E−02 | 3.03288E−03 |
| S12 | −2.88997E+00 | −7.38446E−02 | 2.22826E−02 | −4.80677E−03 | 3.94853E−04 |

| Surface | E(12th) | F(14th) | G(16th) | H(18th) |
|---|---|---|---|---|
| S1 | −2.23292E−01 | 1.83698E−01 | −7.88125E−02 | 1.36207E−02 |
| S2 | −4.80082E−02 | −9.79303E−03 | 1.53218E−02 | −3.62795E−03 |
| S3 | 1.83766E−01 | −1.85123E−01 | 8.38497E−02 | −1.46939E−02 |
| S4 | 9.77138E−02 | −7.82018E−02 | 3.24327E−02 | −5.47087E−03 |
| S5 | 5.89513E−02 | −4.86200E−02 | 2.12010E−02 | −3.67089E−03 |
| S6 | 1.11867E−01 | −5.05415E−02 | 9.62387E−03 | −1.27777E−04 |
| S7 | 4.84355E−01 | −3.04461E−01 | 1.04911E−01 | −1.52916E−02 |
| S8 | −8.03177E−02 | 6.35808E−02 | −2.21592E−02 | 2.87697E−03 |
| S9 | 6.74476E−02 | −1.88480E−02 | 2.96469E−03 | −1.98228E−04 |
| S10 | −4.72984E−03 | 7.19037E−04 | −5.88629E−05 | 1.97022E−06 |
| S11 | −3.96884E−04 | 1.56537E−05 | 1.17114E−06 | −8.96417E−08 |
| S12 | 5.52212E−05 | −1.47801E−05 | 1.17387E−06 | −3.29310E−08 |

Figure 13:
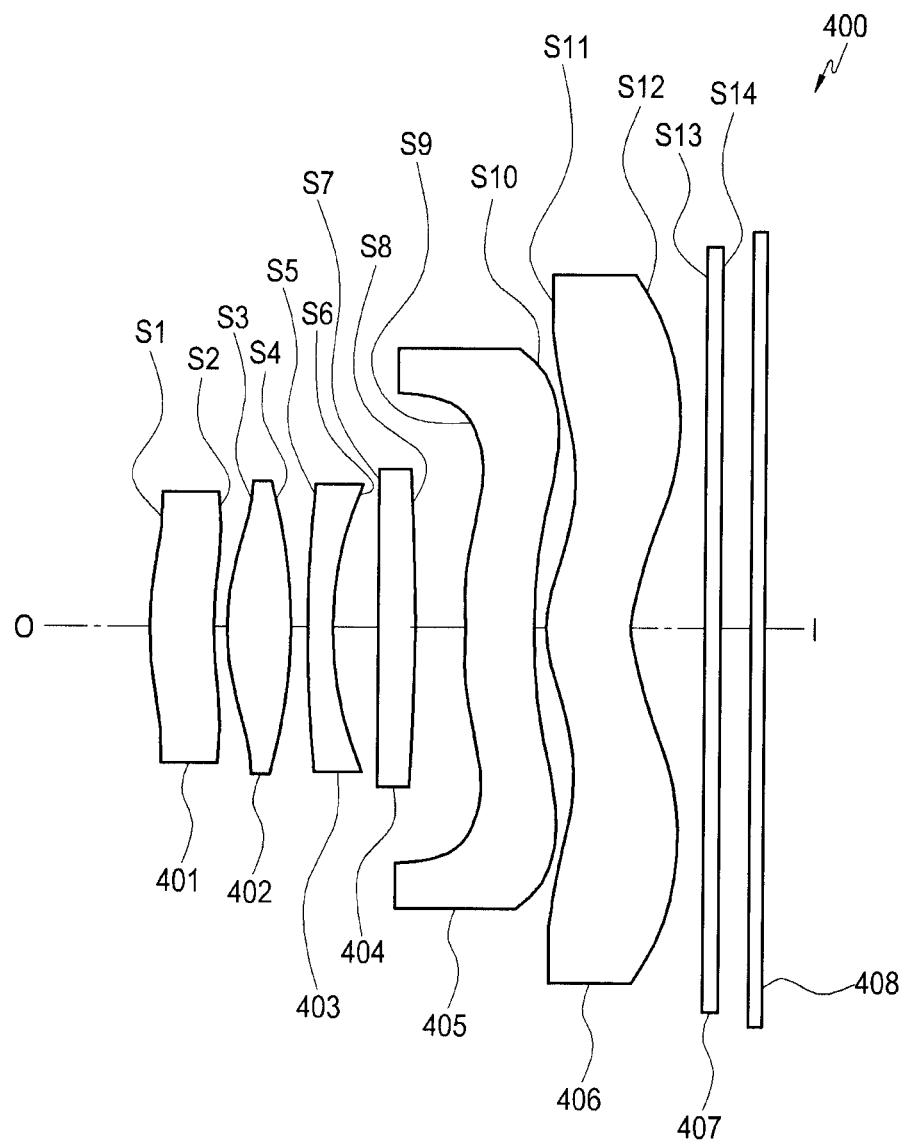
FIG. 13 is a view illustrating a configuration of a short focus lens optical system according to still another one of various embodiments of the present disclosure.
Figure 14:
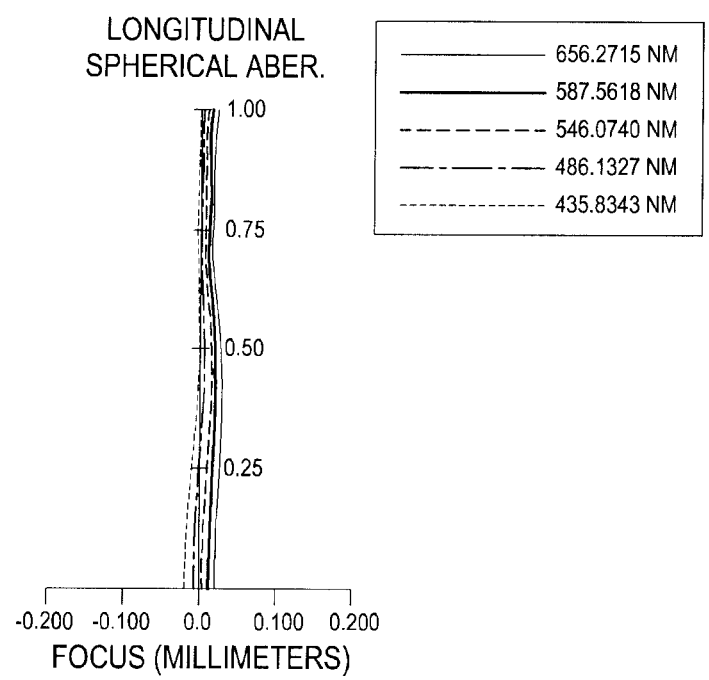
FIG. 14 is a graph illustrating a spherical aberration of the short focus lens optical system according to still another one of various embodiments of the present disclosure.
Figure 15:
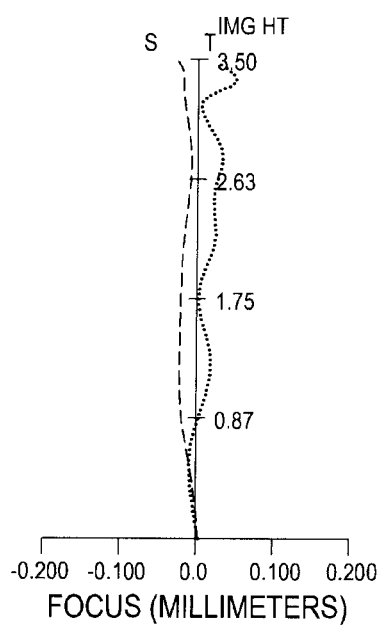
FIG. 15 is a graph illustrating an astigmatism of the short focus lens optical system according to still another one of various embodiments of the present disclosure.
Figure 16:
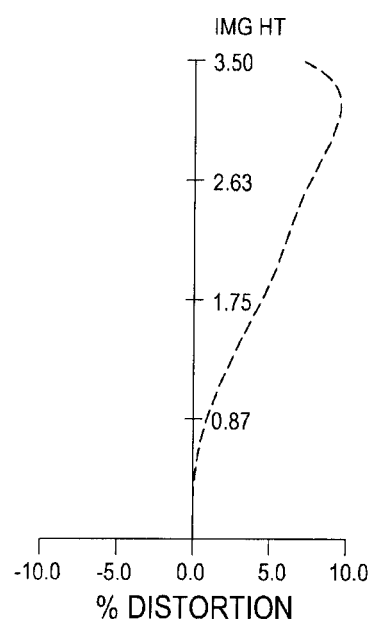
FIG. 16 is a graph illustrating a distortion rate of the short focus lens optical system according to another one of various embodiments of the present disclosure.

FIG. 13 is a view illustrating a configuration of a short focus lens optical system 400 according to still another one of various embodiments of the present disclosure. FIG. 14 is a graph illustrating a spherical aberration of the short focus lens optical system 400 according to still another one of various embodiments of the present disclosure. FIG. 15 is a graph illustrating an astigmatism of the short focus lens optical system 400 according to still another one of various embodiments of the present disclosure. FIG. 16 is a graph illustrating a distortion rate of the short focus lens optical system 400 according to still another one of various embodiments of the present disclosure.

In describing one or more various embodiments of the present disclosure below, the components described therein that can be easily understood through the configuration of the preceding embodiment may be denoted by the same reference numerals or the reference numerals may be omitted, and the detailed descriptions thereof may also be omitted.

Referring to FIGS. 13 to 16, according to still another one of various embodiments of the present disclosure, the short focus lens optical system 400 may include a plurality of lenses 401, 402, 403, 404, 405, and 406, a filter 407, and an image sensor 408.

Data for various characteristics of the lenses in the short focus lens optical system 400 are represented in Table 7 below, and aspherical coefficients of the first to sixth lenses 401, 402, 403, 404, 405, and 406 are represented in Table 8 below. The short focus lens optical system 400 may satisfy the above-mentioned requirements (and/or at least one of the above-mentioned requirements) when the F-number is 1.72, the field angle is 79.23 degrees, and the focal distance is 3.95 mm.

TABLE 7

| Surface | Radius | Thick | nd | vd | H-Ape | EFL |
|---|---|---|---|---|---|---|
| object | infinity | infinity | | | | |
| sto* | infinity | | | | | |
| S1 | 3.236 | 0.532 | 1.5441 | 56.09 | 1.15 | 67.62 |
| S2 | 3.34 | 0.129 | | | 1.18 | |
| S3 | 2.223 | 0.572 | 1.5441 | 56.09 | 1.338 | 3.49 |
| S4 | −12.219 | 0.127 | | | 1.282 | |
| S5 | 6.662 | 0.2 | 1.65 | 21.5 | 1.355 | −10.161 |
| S6 | 3.295 | 0.424 | | | 1.217 | |
| S7 | −21.514 | 0.345 | 1.6428 | 22.4 | 1.322 | −33.254 |
| S8 | infinity | 0.451 | | | 1.4 | |
| S9 | 8.09 | 0.619 | 1.5311 | 55.91 | 2.081 | −41.402 |
| S10 | 5.763 | 0.108 | | | 2.524 | |
| S11 | 1.342 | 0.751 | 1.5441 | 56.09 | 2.805 | 14.022 |
| S12 | 1.305 | 0.679 | | | 3.259 | |
| S13 | infinity | 0.11 | 1.5168 | 64.2 | | |
| S14 | infinity | 0.3 | | | — | |
| image | infinity | | | | — | |

TABLE 8

| Surface | K(Conic) | A(4th) | B(6th) | C(8th) | D(10th) |
|---|---|---|---|---|---|
| S1 | −2.84952E+00 | −3.89988E−02 | 5.24335E−03 | −6.82401E−02 | 1.56251E−01 |
| S2 | −5.96905E+00 | −1.24007E−01 | 2.54147E−02 | −5.85513E−02 | 9.78055E−02 |
| S3 | −6.64722E+00 | −1.48384E−02 | −3.84742E−02 | 4.23346E−02 | −7.89683E−02 |
| S4 | 4.46794E+01 | −5.34241E−02 | −1.10533E−02 | 5.46690E−02 | −7.98795E−02 |
| S5 | 2.11226E+01 | −9.98797E−02 | 9.02814E−02 | −3.26279E−02 | −3.24278E−02 |
| S6 | −4.75224E+00 | −1.50910E−02 | 4.89520E−02 | 2.12313E−02 | −1.11734E−01 |
| S7 | 1.00000E+02 | −2.07349E−02 | −9.04563E−02 | 2.92121E−01 | −4.67736E−01 |
| S8 | −1.00000E+02 | −1.25215E−02 | −8.28272E−02 | 7.97648E−02 | 1.90097E−02 |
| S9 | −1.33311E+02 | 2.07388E−01 | −2.65871E−01 | 2.31140E−01 | −1.51869E−01 |
| S10 | −1.38892E+01 | 2.18206E−02 | 2.87225E−02 | −3.88308E−02 | 1.81759E−02 |
| S11 | −3.39100E+00 | −1.08538E−01 | 3.52713E−02 | −1.17762E−02 | 3.03431E−03 |
| S12 | −2.62197E+00 | −7.57446E−02 | 2.25424E−02 | −4.78752E−03 | 3.94698E−04 |

| Surface | E(12th) | F(14th) | G(16th) | H(18th) |
|---|---|---|---|---|
| S1 | −2.22794E−01 | 1.83676E−01 | −7.88125E−02 | 1.36207E−02 |
| S2 | −4.79826E−02 | −9.84432E−03 | 1.53218E−02 | −3.62795E−03 |
| S3 | 1.84138E−01 | −1.85186E−01 | 8.38599E−02 | −1.46939E−02 |
| S4 | 9.74870E−02 | −7.83515E−02 | 3.24693E−02 | −5.47088E−03 |
| S5 | 5.83271E−02 | −4.82455E−02 | 2.11617E−02 | −3.67089E−03 |
| S6 | 1.11841E−01 | −5.05771E−02 | 9.62387E−03 | −1.27777E−04 |
| S7 | 4.84292E−01 | −3.04545E−01 | 1.04970E−01 | −1.52916E−02 |
| S8 | −8.03379E−02 | 6.36161E−02 | −2.21195E−02 | 2.87453E−03 |
| S9 | 6.74263E−02 | −1.88443E−02 | 2.96753E−03 | −1.98799E−04 |
| S10 | −4.73209E−03 | 7.18234E−04 | −5.86945E−05 | 1.97022E−06 |
| S11 | −3.96924E−04 | 1.56349E−05 | 1.16931E−06 | −8.97248E−08 |
| S12 | 5.51008E−05 | −1.47904E−05 | 1.17357E−06 | −3.29123E−08 |

Figure 17:
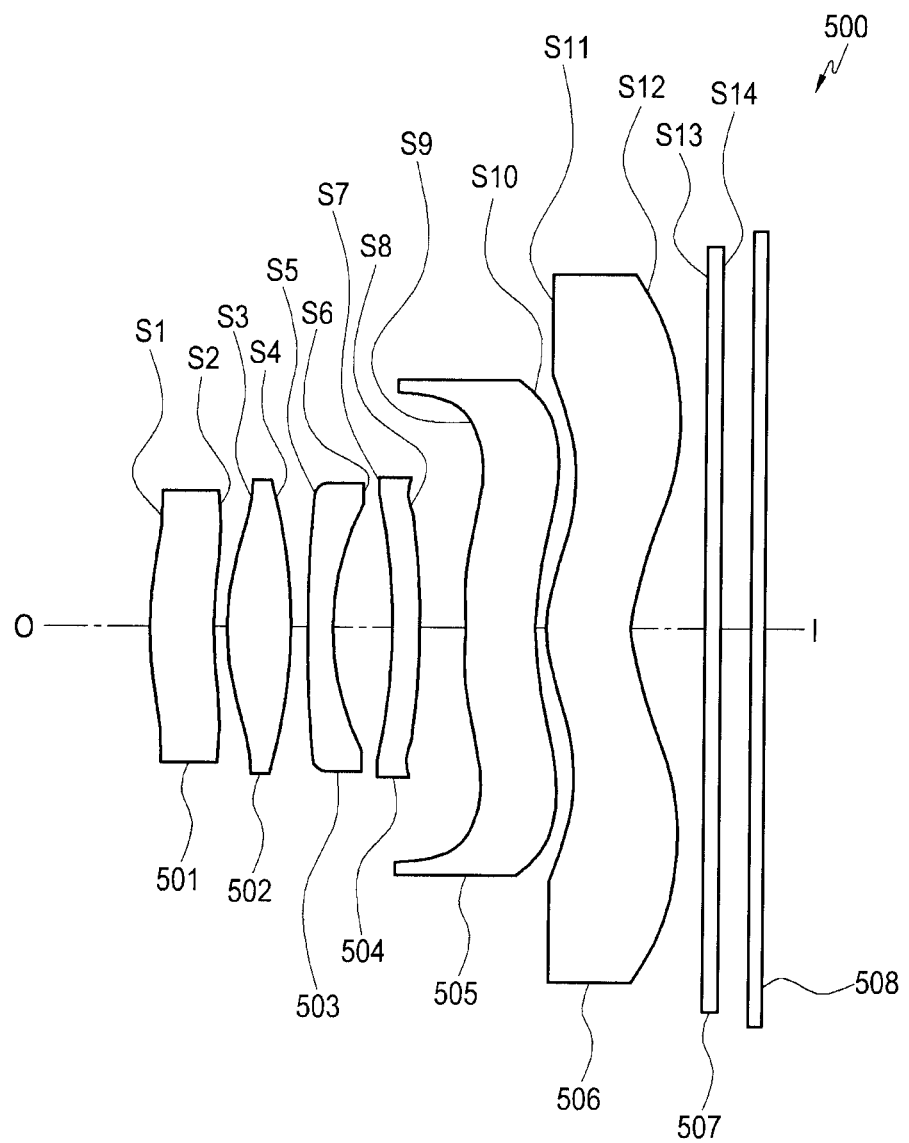
FIG. 17 is a view illustrating a configuration of a short focus lens optical system according to yet another one of various embodiments of the present disclosure.
Figure 18:
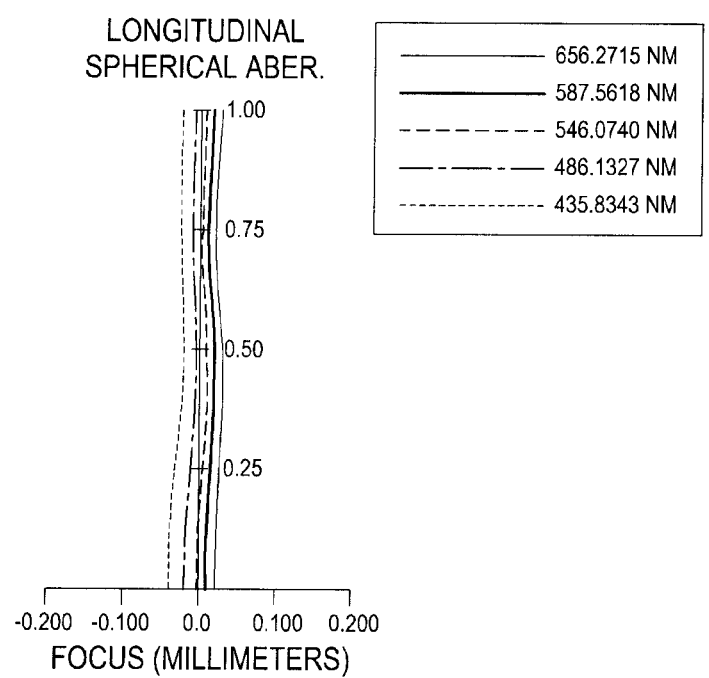
FIG. 18 is a graph illustrating a spherical aberration of the short focus lens optical system according to yet another one of various embodiments of the present disclosure.
Figure 19:
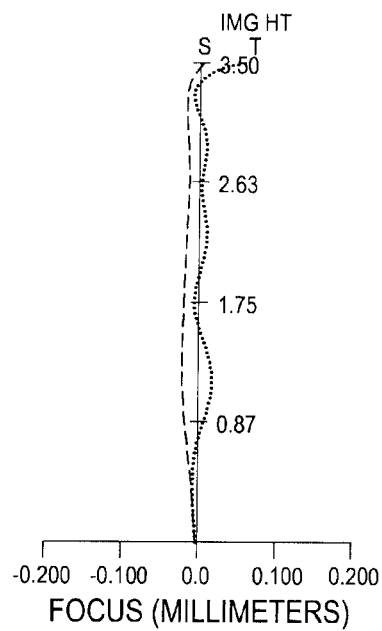
FIG. 19 is a graph illustrating an astigmatism of the short focus lens optical system according to yet another one of various embodiments of the present disclosure.
Figure 20:
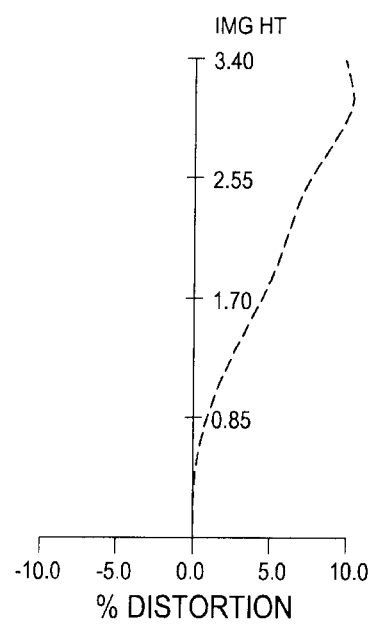
FIG. 20 is a graph illustrating a distortion rate of the short focus lens optical system according to yet another one of various embodiments of the present disclosure.

FIG. 17 is a view illustrating a configuration of a short focus lens optical system 500 according to yet another one of various embodiments of the present disclosure. FIG. 18 is a graph illustrating a spherical aberration of the short focus lens optical system 500 according to yet another one of various embodiments of the present disclosure. FIG. 19 is a graph illustrating an astigmatism of the short focus lens optical system 500 according to yet another one of various embodiments of the present disclosure. FIG. 20 is a graph illustrating a distortion rate of the short focus lens optical system 500 according to still another one of various embodiments of the present disclosure.

In describing one or more embodiments of the present disclosure below, the components described therein that can be easily understood through the configuration of the preceding embodiment may be denoted by the same reference numerals or the reference numerals may be omitted, and the detailed descriptions thereof may also be omitted.

Referring to FIGS. 17 to 20, according to still another one of various embodiments of the present disclosure, the short focus lens optical system 500 may include a plurality of lenses 501, 502, 503, 504, 505, and 506, a filter 507, and an image sensor 508.

Data for various characteristics of the lenses in the short focus lens optical system 500 are represented in Table 9 below, and aspherical coefficients of the first to sixth lenses 501, 502, 503, 504, 505, and 506 are represented in Table 10 below. The short focus lens optical system 500 may satisfy the above-mentioned requirements (and/or at least one of the above-mentioned requirements) when the F-number is 1.82, the field angle is 76.00 degrees, and the focal distance is 4.00 mm.

TABLE 9

| Surface | Radius | Thick | nd | vd | H-Ape | EFL |
|---|---|---|---|---|---|---|
| object | infinity | infinity | | | | |
| sto* | infinity | | | | | |
| S1 | 3.106 | 0.512 | 1.54419 | 71.95 | 1.1 | 67.611 |

TABLE 9-continued

| Surface | Radius | Thick | nd | vd | H-Ape | EFL |
|---|---|---|---|---|---|---|
| S2 | 3.194 | 0.127 | | | 1.18 | |
| S3 | 2.192 | 0.593 | 1.5441 | 56.09 | 1.336 | 3.459 |
| S4 | −12.428 | 0.1 | | | 1.282 | |
| S5 | 6.607 | 0.2 | 1.65 | 35 | 1.363 | −10.463 |
| S6 | 3.322 | 0.434 | | | 1.217 | |
| S7 | −13.029 | 0.307 | 1.6428 | 22.4 | 1.247 | −30 |
| S8 | −39.689 | 0.488 | | | 1.4 | |
| S9 | 19.861 | 0.62 | 1.5311 | 55.91 | 2.081 | −49.969 |
| S10 | 11.257 | 0.1 | | | 2.17 | |
| S11 | 1.331 | 0.751 | 1.5441 | 56.09 | 2.386 | 17.239 |
| S12 | 1.241 | 0.705 | | | 3.2 | |
| S13 | infinity | 0.11 | 1.5168 | 64.2 | | |
| S14 | infinity | 0.3 | | | | |
| image | infinity | | | | | |

TABLE 10

| Surface | K(Conic) | A(4th) | B(6th) | C(8th) | D(10th) |
|---|---|---|---|---|---|
| S1 | −2.76344E+00 | −3.86898E−02 | 5.60283E−03 | −6.79569E−02 | 1.56236E−01 |
| S2 | −6.26729E+00 | −1.24180E−01 | 2.62060E−02 | −5.77050E−02 | 9.79735E−02 |
| S3 | −6.65021E+00 | −1.57407E−02 | −3.89790E−02 | 4.23308E−02 | −7.88817E−02 |
| S4 | 5.00851E+01 | −5.35445E−02 | −1.73109E−03 | 5.38856E−02 | −8.01357E−02 |
| S5 | 2.21790E+01 | −1.02163E−01 | 9.02573E−02 | −3.25384E−02 | −3.24467E−02 |
| S6 | −6.36452E+00 | −2.09284E−02 | 4.44278E−02 | 1.93572E−02 | −1.12534E−01 |
| S7 | 1.00000E+02 | −3.01229E−02 | −9.07121E−02 | 2.91338E−01 | −4.68290E−01 |
| S8 | −1.00000E+02 | −1.05605E−02 | −8.21460E−02 | 8.03532E−02 | 1.91469E−02 |
| S9 | −6.89111E+02 | 2.10974E−01 | −2.65901E−01 | 2.31281E−01 | −1.51879E−01 |
| S10 | 4.43869E+00 | 2.38879E−02 | 2.79893E−02 | −3.90251E−02 | 1.81772E−02 |
| S11 | −3.57390E+00 | −1.03265E−01 | 3.45738E−02 | −1.18064E−02 | 3.03421E−03 |
| S12 | −2.65932E+00 | −7.52809E−02 | 2.28405E−02 | −4.78545E−03 | 3.92683E−04 |

| Surface | E(12th) | F(14th) | G(16th) | H(18th) |
|---|---|---|---|---|
| S1 | −2.22845E−01 | 1.83747E−01 | −7.88125E−02 | 1.36207E−02 |
| S2 | −4.80580E−02 | −9.79858E−03 | 1.53218E−02 | −3.62795E−03 |
| S3 | 1.84159E−01 | −1.85222E−01 | 8.38599E−02 | −1.46939E−02 |
| S4 | 9.75025E−02 | −7.82943E−02 | 3.24999E−02 | −5.47088E−03 |
| S5 | 5.83017E−02 | −4.82320E−02 | 2.11617E−02 | −3.67089E−03 |
| S6 | 1.11563E−01 | −5.05773E−02 | 9.62387E−03 | −1.27777E−04 |
| S7 | 4.84023E−01 | −3.04736E−01 | 1.04970E−01 | −1.52916E−02 |
| S8 | −8.03488E−02 | 6.36059E−02 | −2.21066E−02 | 2.87464E−03 |
| S9 | 6.74103E−02 | −1.88483E−02 | 2.96732E−03 | −1.98459E−04 |
| S10 | −4.72966E−03 | 7.18341E−04 | −5.87895E−05 | 1.97022E−06 |
| S11 | −3.96783E−04 | 1.56607E−05 | 1.17178E−06 | −8.96402E−08 |
| S12 | 5.49843E−05 | −1.47913E−05 | 1.17429E−06 | −3.28355E−08 |

Data for various characteristics of the lenses in the short focus lens optical systems 100, 200, 300, 400, and 500 described above with reference to the embodiments and/or the lenses of each of the short focus lens optical systems 100, 200, 300, 400, and 500 are represented in Table 11 as follows. The data may satisfy the above-mentioned requirements (e.g., Equations 1 to 9).

TABLE 11

| | Equation 1 | Equation 2 | Equation 3 | Equation 4 | Equation 5 | Equation 6 | Equation 7 | Equation 8 | Equation 9 |
|---|---|---|---|---|---|---|---|---|---|
| Embodiment 1 | 1.187 | 0.393 | 21.485 | −0.265 | 0.019 | 0.117 | 0.372 | 0.011 | 1.523 |
| Embodiment 2 | 1.137 | 0.456 | 21.485 | −0.158 | 0.121 | 0.143 | 0.440 | 0.027 | 1.500 |
| Embodiment 3 | 1.133 | 0.495 | 21.500 | −0.182 | −0.119 | 0.129 | 0.168 | 0.014 | 1.527 |
| Embodiment 4 | 1.156 | 0.503 | 35.000 | −0.176 | −0.133 | 0.144 | 0.276 | 0.035 | 1.571 |
| Embodiment 5 | 0.741 | −0.500 | 21.485 | −0.987 | 0.000 | 0.098 | 1.504 | 0.507 | 1.397 |

In Table 11 above, "Embodiment 1" may refer to the short focus lens optical system 100 illustrated in FIG. 1, "Embodiment 2" may refer to the short focus lens optical system 200 illustrated in FIG. 5, "Embodiment 3" may refer to the short focus lens optical system 300 illustrated in FIG. 9, "Embodiment 4" may refer to the short focus lens optical system 400 illustrated in FIG. 13, and "Embodiment 5" may refer to the short focus lens optical system 500 illustrated in FIG. 17.

As described above, according to one or more embodiments of the present disclosure, a short focus lens optical system 100, 200, 300, 400, or 500 may include a small number of lenses (e.g., six (6) lenses), and may easily acquire an image of high quality (e.g., a bright image with a high resolution) by adjusting the curvature radius of the faces of each lens.

As described above, according to one embodiment of the present disclosure, an optical system may include: a first lens having a positive refractive power and disposed along an optical axis and to face an object, the first lens further having a first convex face facing the object; a second lens having a positive refractive power and disposed along the optical axis adjacent to the first lens, the second lens further having a second convex face facing the object; a third lens having a negative refractive power and disposed along the optical axis adjacent to the second lens, the third lens further having a third concave face facing an image sensor; a fourth lens disposed along the optical axis adjacent to the third lens, the fourth lens being an aspherical lens; a fifth lens disposed along the optical axis adjacent to the fourth lens, the fifth lens being an aspherical lens and having a fourth face facing the object, the fourth face being convex where the fifth lens intersects the optical axis; and a sixth lens disposed along the optical axis adjacent to the fifth lens, the sixth lens is an aspherical lens. The fourth face of the fifth lens and a fifth face of the sixth lens facing the object has at least one inflection point, and characteristics of the optical system satisfy equation:

$$0.4 < \frac{f}{f2} < 1.6$$

wherein "f" represents a focal distance of the optical system, and "f2" represents a focal distance of the second lens.

According to one embodiment, characteristics of the third lens satisfy equation:

$$-0.6 < \frac{R6}{R5} < 0.6$$

wherein "R5" represents a curvature radius of a face of the third lens facing the object, and "R6" represents a curvature radius of the third concave face of the third lens facing the image sensor.

According to one embodiment, characteristics of the third lens satisfy equation:

$$vd < 45$$

wherein "vd" represents an Abbe number of the third lens.

According to one embodiment, characteristics of the second lens satisfy equation:

$$-2 < \frac{R3}{R4} < 0$$

wherein "R3" represents a curvature radius of the second convex face of the second lens facing the object, and "R4" represents a curvature radius of a face of the second lens facing the image sensor.

According to one embodiment, the characteristics of the fourth lens satisfy equation:

$$-0.15 < \frac{f}{f4} < 0.15$$

wherein "f4" represents a focal distance of the fourth lens.

According to one embodiment of the present disclosure, characteristics of the third lens and the fourth lens satisfy equation:

$$0 < \frac{t58}{Y_{IH}} < 1$$

wherein "t58" represents a distance on the optical axis from a face of the third lens facing the object to a face of the fourth lens facing the image sensor, and "$Y_{IH}$" represents a maximum height of an image captured by the image sensor.

According to one embodiment of the present disclosure, characteristics of the fifth lens satisfy equation:

$$0 < \frac{R9 - R10}{R9 + R10} < 3$$

wherein "R9" represents a curvature radius of the fourth face of the fifth lens facing the object, and "R10" represents a curvature radius of a face of the fifth lens facing the image sensor.

According to one embodiment of the present disclosure, characteristics of the sixth lens satisfy equation:

$$0 < \frac{R11 - R12}{R11 + R12} < 0.8$$

wherein "R11" represents a curvature radius of the fifth face of the sixth lens facing the object, and "R12" represents a curvature radius of a face of the sixth lens facing the image sensor.

According to one embodiment of the present disclosure, characteristics of the first lens satisfy equation:

$$1.0 < \frac{TT}{Y_{IH}} < 1.8$$

wherein "TT" represents a distance on the optical axis from the first face of the first lens facing the object to an imaging face of the image sensor, and $Y_{IH}$ represents a maximum height of an image captured by the image sensor.

According to one embodiment of the present disclosure, the optical system has a field angle of approximately 80 degrees.

As described above, according to one embodiment of the present disclosure, an imaging device may include: an optical system; an image sensor for detecting an image of an object; and an image signal processor. The optical system may include: a first lens having a positive refractive power and disposed along an optical axis and to face the object, the first lens further having a first convex face facing the object; a second lens having a positive refractive power and disposed along the optical axis adjacent to the first lens, the second lens further having a second convex face facing the object; a third lens having a negative refractive power and disposed along the optical axis adjacent to the second lens, the third lens further having a third concave face facing the image sensor; a fourth lens disposed along the optical axis adjacent to the third lens, the fourth lens being an aspherical lens; a fifth lens disposed along the optical axis adjacent to the fourth lens, the fifth lens being an aspherical lens and having a fourth face facing the object, the fourth face being convex where the fifth lens intersects the optical axis; and a sixth lens disposed along the optical axis adjacent to the fifth lens, the sixth lens being an aspherical lens. The fourth face of the fifth lens and a fifth face of the sixth lens facing the object has at least one inflection point, and characteristics of the optical system satisfy equation:

$$0.4 < \frac{f}{f2} < 1.6$$

wherein "f" represents a focal distance of the optical system, and "f2" represents a focal distance of the second lens.

According to one embodiment, characteristics of the third lens satisfy equation:

$$-0.6 < \frac{R6}{R5} < 0.6$$

wherein "R5" represents a curvature radius of a face of the third lens facing the object, and "R6" represents a curvature radius of the third concave face of the third lens facing the image sensor.

According to one embodiment, the characteristics of the third lens satisfy equation:

$$vd < 45$$

wherein "vd" represents an Abbe number of the third lens.

According to one embodiment, the characteristics of the second lens satisfy equation:

$$-2 < \frac{R3}{R4} < 0$$

wherein "R3" represents a curvature radius of the second convex face of the second lens facing the object, and "R4" represents a curvature radius of a face of the second lens facing the image sensor.

According to one embodiment, characteristics of the fourth lens satisfy equation:

$$-0.15 < \frac{f}{f4} < 0.15$$

wherein "f4" represents a focal distance of the fourth lens.

According to one embodiment of the present disclosure, characteristics of the third lens and the fourth lens satisfy equation:

$$0 < \frac{t58}{Y_{IH}} < 1$$

wherein "t58" represents a distance on the optical axis from a face of the third lens facing the object to a face of the fourth lens facing the image sensor, and "$Y_{IH}$" represents a maximum height of the image detected by the image sensor.

According to one embodiment of the present disclosure, characteristics of the fifth lens satisfy equation:

$$0 < \frac{R9 - R10}{R9 + R10} < 3$$

wherein "R9" represents a curvature radius of the fourth face of the fifth lens facing the object, and "R10" represents a curvature radius of a face of the fifth lens facing the image sensor.

According to one embodiment of the present disclosure, characteristics of the sixth lens satisfy equation:

$$0 < \frac{R11 - R12}{R11 + R12} < 0.8$$

wherein "R11" represents a curvature radius of the fifth face of the sixth lens facing the object, and "R12" represents a curvature radius of a face of the sixth lens facing the image sensor.

According to various embodiments, characteristics of the first lens satisfy equation:

$$1.0 < \frac{TT}{Y_{IH}} < 1.8$$

wherein "TT" represents a distance on the optical axis from the first face of the first lens facing the object, to an imaging face of the image sensor, and $Y_{IH}$ represents a maximum height of an image detected by the image sensor.

According to one embodiment of the present disclosure, the image sensor may detect an image that sequentially passes the first, second, third, fourth, fifth, and sixth lenses, and the image signal processor may store or output the image.

An imaging device according to one embodiment of the present disclosure may further include a memory that stores the image.

The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. No claim element herein is to be construed under the provisions of 35 U.S.C. 112, sixth paragraph, unless the element is expressly recited using the phrase "means for."

One or more embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. An optical system comprising:
a first lens having a positive refractive power and disposed along an optical axis and to face an object, the first lens further having a first convex face facing the object;
a second lens having a positive refractive power and disposed along the optical axis adjacent to the first lens, the second lens further having a second convex face facing the object;
a third lens having a negative refractive power and disposed along the optical axis adjacent to the second lens, the third lens further having a third concave face facing an image sensor;
a fourth lens disposed along the optical axis adjacent to the third lens, the fourth lens being an aspherical lens;
a fifth lens disposed along the optical axis adjacent to the fourth lens, the fifth lens being an aspherical lens and having a fourth face facing the object, the fourth face being convex where the fifth lens intersects the optical axis; and a sixth lens disposed along the optical axis adjacent to the fifth lens, the sixth lens being an aspherical lens,
wherein the fourth face of the fifth lens and a fifth face of the sixth lens facing the object each has at least one inflection point, and characteristics of the optical system satisfy equation $$0.4 < \frac{f}{f2} < 1.6$$

wherein "f" represents a focal distance of the optical system, and "f2" represents a focal distance of the second lens,
wherein characteristics of the fourth lens satisfy equation $$-0.15 < \frac{f}{f4} < 0.15$$

wherein "f4" represents a focal distance of the fourth lens, and
wherein characteristics of the sixth lens satisfy equation $$0 < \frac{R11 - R12}{R11 + R12} < 0.8$$

wherein "R11" represents a curvature radius of the fifth face of the sixth lens facing the object, and "R12" represents a curvature radius of a face of the sixth lens facing the image sensor.

2. The optical system of claim 1, wherein characteristics of the third lens satisfy equation $$-0.6 < \frac{R6}{R5} < 0.6$$

wherein "R5" represents a curvature radius of a face of the third lens facing the object, and "R6" represents a curvature radius of the third concave face of the third lens facing the image sensor.

3. The optical system of claim 2, wherein characteristics of the third lens satisfy equation $Vd < 45$ wherein "vd" represents an Abbe number of the third lens.

4. The optical system of claim 1, wherein characteristics of the second lens satisfy equation $$-2 < \frac{R3}{R4} < 0$$

wherein "R3" represents a curvature radius of the second convex face of the second lens facing the object, and "R4" represents a curvature radius of a face of the second lens facing the image sensor.

5. The optical system of claim 1, wherein characteristics of the third lens and the fourth lens satisfy equation $$0 < \frac{t58}{Y_{IH}} < 1$$

wherein "t58" represents a distance on the optical axis from a face of the third lens facing the object to a face of the fourth lens facing the image sensor, and "$Y_{IH}$" represents a maximum height of an image captured by the image sensor.

6. The optical system of claim 1, wherein characteristics of the fifth lens satisfy equation $$0 < \frac{R9 - R10}{R9 + R10} < 3$$

wherein "R9" represents a curvature radius of the fourth face of the fifth lens facing the object, and "R10" represents a curvature radius of a face of the fifth lens facing the image sensor.

7. The optical system of claim 1, wherein characteristics of the first lens satisfy equation $$1.0 < \frac{TT}{Y_{IH}} < 1.8$$

wherein "TT" represents a distance on the optical axis from the first face of the first lens facing the object to an imaging face of the image sensor, and $Y_{IH}$ represents a maximum height of an image captured by the image sensor.

8. The optical system of claim 1, wherein the optical system has a field angle of approximately 80 degrees.

9. An imaging device comprising:
an optical system;
an image sensor for detecting an image of an object; and
an image signal processor,
wherein the optical system includes:
a first lens having a positive refractive power and disposed along an optical axis and to face the object, the first lens further having a first convex face facing the object;
a second lens having a positive refractive power and disposed along the optical axis adjacent to the first lens, the second lens further having a second convex face facing the object;
a third lens having a negative refractive power and disposed along the optical axis adjacent to the second lens, the third lens further having a third concave face facing the image sensor;
a fourth lens disposed along the optical axis adjacent to the third lens, the fourth lens being an aspherical lens;
a fifth lens disposed along the optical axis adjacent to the fourth lens, the fifth lens being an aspherical lens and having a fourth face facing the object, the fourth face being convex where the fifth lens intersects the optical axis; and
a sixth lens disposed along the optical axis adjacent to the fifth lens, the sixth lens being an aspherical lens,
wherein the fourth face of the fifth lens and a fifth face of the sixth lens facing the object each has at least one inflection point, and characteristics of the optical system satisfy equation $$0.4 < \frac{f}{f2} < 1.6$$

wherein "f" represents a focal distance of the optical system, and "f2" represents a focal distance of the second lens, wherein characteristics of the fourth lens satisfy equation $$-0.15 < \frac{f}{f4} < 0.15$$

wherein "f4" represents a focal distance of the fourth lens, and wherein characteristics of the sixth lens satisfy equation $$0 < \frac{R11 - R12}{R11 + R12} < 0.8$$

wherein "R11" represents a curvature radius of the fifth face of the sixth lens facing the object, and "R12" represents a curvature radius of a face of the sixth lens facing the image sensor.

10. The imaging device of claim 9, wherein characteristics of the third lens satisfy equation $$-0.6 < \frac{R6}{R5} < 0.6$$

wherein "R5" represents a curvature radius of a face of the third lens facing the object, and "R6" represents a curvature radius of the third concave face of the third lens facing the image sensor.

11. The imaging device of claim 10, wherein characteristics of the third lens satisfy equation $$vd < 45$$

wherein "vd" represents an Abbe number of the third lens.

12. The imaging device of claim 9, wherein characteristics of the second lens satisfy equation $$-2 < \frac{R3}{R4} < 0$$

wherein "R3" represents a curvature radius of the second convex face of the second lens facing the object, and "R4" represents a curvature radius of a face of the second lens facing the image sensor.

13. The imaging device of claim 9, wherein characteristics of the third lens and the fourth lens satisfy equation $$0 < \frac{t58}{Y_{IH}} < 1$$

wherein "t58" represents a distance on the optical axis from a face of the third lens facing the object to a face of the fourth lens facing the image sensor, and "$Y_{IH}$" represents a maximum height of the image detected by the image sensor.

14. The imaging device of claim 9, wherein characteristics of the fifth lens satisfy equation $$0 < \frac{R9 - R10}{R9 + R10} < 3$$

wherein "R9" represents a curvature radius of the fourth face of the fifth lens facing the object, and "R10" represents a curvature radius of a face of the fifth lens facing the image sensor.

15. The imaging device of claim 9, wherein characteristics of the first lens satisfy equation $$1.0 < \frac{TT}{Y_{IH}} < 1.8$$

wherein "TT" represents a distance on the optical axis from the first face of the first lens facing the object, to an imaging face of the image sensor, and $Y_{IH}$ represents a maximum height of an image detected by the image sensor.

16. The imaging device of claim 9, wherein the image sensor detects an image that sequentially passes the first, second, third, fourth, fifth, and sixth lenses, and the image signal processor stores or outputs the image.

17. The imaging device of claim 9, further comprising: a memory that stores the image.

18. The imaging device of claim 9, wherein the optical system has a field angle of approximately 80 degrees.

* * * * *